United States Patent
Liang et al.

(10) Patent No.: US 10,743,175 B2
(45) Date of Patent: *Aug. 11, 2020

(54) METHOD, APPARATUS, AND SYSTEM FOR DISASTER RECOVERY OF IMS

(71) Applicant: Huawei Technologies Co., Ltd., Shenzhen (CN)

(72) Inventors: Feng Liang, Shenzhen (CN); Linfei Shen, Singapore (SG); Shufeng Shi, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/426,831

(22) Filed: May 30, 2019

(65) Prior Publication Data

US 2019/0281448 A1    Sep. 12, 2019

Related U.S. Application Data

(63) Continuation of application No. 15/830,946, filed on Dec. 4, 2017, now Pat. No. 10,321,307, which is a (Continued)

(30) Foreign Application Priority Data

Sep. 28, 2007 (CN) ........................... 2007 1 0030717
Oct. 26, 2007 (CN) ........................... 2007 1 0167738

(51) Int. Cl.
*H04L 1/22* (2006.01)
*H04W 8/30* (2009.01)
(Continued)

(52) U.S. Cl.
CPC ........... *H04W 8/30* (2013.01); *H04L 65/1016* (2013.01); *H04L 67/306* (2013.01); *H04L 69/40* (2013.01)

(58) Field of Classification Search
CPC ... H04L 65/1016; H04L 67/306; H04L 69/40; H04W 8/30
See application file for complete search history.

(56) References Cited

U.S. PATENT DOCUMENTS 6,202,071 B1    3/2001  Keene
8,069,365 B2   11/2011  Gu et al.
(Continued)

FOREIGN PATENT DOCUMENTS

CN    1756181 A    4/2006
CN    1905472 A    1/2007
(Continued)

OTHER PUBLICATIONS

Huawei, "Discussion on the failure of the S-CSCF," 3GPP TSG CT WG4 Meeting #36 C4-071026, Aug. 20-24, 2007, 12 pages.
(Continued)

*Primary Examiner* — Luat Phung
(74) *Attorney, Agent, or Firm* — Conley Rose, P.C.

(57) ABSTRACT

A method, apparatus, and system for disaster recovery of an Internet Protocol (IP) Multimedia Subsystem (IMS), where the method includes triggering a redundant Call Session Control Function (CSCF), obtaining, by the redundant CSCF, user backup data of registered IMS Private User Identities (IMPIs) that are associated with IMPUs and user service configuration data of IMS Public User Identities (IMPUs) in an IMS subscription from a network storage entity of a user; and recovering, by the redundant CSCF, a corresponding service according to the obtained user backup data of the registered IMPIs and user service configuration data of the IMPUs in the IMS subscription. Hence, the one-IMPU multi-IMPI, one-IMPI multi-IMPU, or multi-IMPI multi-IMPU service can be recovered, and this enables the user to have better service continuity experiences.

20 Claims, 19 Drawing Sheets

Related U.S. Application Data continuation of application No. 15/463,483, filed on Mar. 20, 2017, now Pat. No. 9,883,380, which is a continuation of application No. 13/350,654, filed on Jan. 13, 2012, now Pat. No. 9,661,028, which is a continuation of application No. 12/580,643, filed on Oct. 16, 2009, now Pat. No. 8,228,787, which is a continuation of application No. PCT/CN2008/072583, filed on Sep. 28, 2008.

(51) Int. Cl.
    *H04L 29/06*      (2006.01)
    *H04L 29/08*      (2006.01)
    *H04L 29/14*      (2006.01)

(56) References Cited

U.S. PATENT DOCUMENTS

| | | | |
|---|---|---|---|
| 8,332,514 B2* | 12/2012 | Qiu | H04L 47/125 709/226 |
| 8,665,862 B1* | 3/2014 | Stegall | H04W 36/0022 370/331 |
| 8,805,361 B2 | 8/2014 | Kieselmann et al. | |
| 9,032,483 B2* | 5/2015 | Cai | H04L 9/3271 726/4 |
| 2003/0027569 A1 | 2/2003 | Ejzak | |
| 2007/0189215 A1 | 8/2007 | Wu et al. | |
| 2008/0162637 A1 | 7/2008 | Adamczyk et al. | |
| 2009/0023443 A1* | 1/2009 | Kieselmann | H04L 63/08 455/433 |
| 2009/0210743 A1 | 8/2009 | Gu et al. | |

FOREIGN PATENT DOCUMENTS

| | | |
|---|---|---|
| CN | 1937842 A | 3/2007 |
| CN | 101170553 A | 4/2008 |
| EP | 1611764 B1 | 5/2007 |
| EP | 1914937 A1 | 4/2008 |
| RU | 2006109469 A | 7/2006 |
| RU | 2283542 C2 | 9/2006 |
| RU | 2291593 C2 | 1/2007 |
| WO | 2009006942 A1 | 1/2009 |

OTHER PUBLICATIONS

"3rd Generation Partnership Project; Technical Specification Group Core Network and Terminals; Study on IMS Restoration Procedures (Release 9)," 3GPP TR 23.820 V9.0.0, Sep. 2009, 43 pages.

"3rd Generation Partnership Project; Technical Specification Group Core Network and Terminals; IP multimedia call control protocol based on Session Initiation Protocol (SIP) and Session Description Protocol (SDP); Stage 3 (Release 7)," 3GPP TS 24.229 V7.9.0, Sep. 25, 2007, 425 pages.

"3rd Generation Partnership Project; Technical Specification Group Core Network and Terminals; Cx and Dx interfaces based on the Diameter protocol; Protocol details (Release 7)," 3GPP TS 29.229 V7.6.0, Sep. 24, 2007, 28 pages.

"3rd Generation Partnership Project; Technical Specification Group Radio Access Network; Evolved Universal Terrestrial Radio Access (E-UTRA); Physical channels and modulation (Release 8)," 3GPP TS 36.211 V8.0.0, Sep. 2007, 50 pages.

"3rd Generation Partnership Project; Technical Specification Group Core Network and Terminals; Study on IMS Restoration Procedures (Release 8)," 3GPP TR 23.820 V0.2.0, Aug. 2007, 17 pages.

"3rd Generation Partnership Project; Technical Specification Group Radio Access Network; Physical layer aspects for evolved Universal Terrestrial Radio Access (UTRA) (Release 7)," 3GPP TR 25.814 V7.1.0, Sep. 2006, 132 pages.

"3rd Generation Partnership Project; Technical Specification Group Core Network and Terminals; IP Multimedia (IM) Subsystem Cx and Dx interfaces; Signalling flows and message contents (Release 7)," 3GPP TS 29.228 V7.7.0, Sep. 24, 2007, 61 pages.

"3rd Generation Partnership Project; Technical Specification Group Services and System Aspects; IP Multimedia Subsystem (IMS); Stage 2 (Release 6)," 3GPP TS 23.228 V6.8.0, Dec. 2004, 180 pages.

"3rd Generation Partnership Project; Technical Specification Group Core Network; Cx and Dx interfaces based on the Diameter protocol; Protocol details (Release 5)," 3GPP TS 29.229 V5.11.0, Sep. 2005, 28 pages.

Foreign Communication From a Counterpart Application, European Application No. 08836172.0, Extended European Search Report dated Mar. 19, 2010, 6 pages.

Foreign Communication From a Counterpart Application, Russian Application No. 2010106182, Russian Office Action dated Sep. 12, 2011, 8 pages.

Foreign Communication From a Counterpart Application, Russian Application No. 2010106182, English Translation of Russian Office Action dated Sep. 12, 2011, 7 pages.

Foreign Communication From a Counterpart Application, Russian Application No. 2010106182, Russian Notice of Allowance dated Dec. 2, 2011, 34 pages.

Foreign Communication From a Counterpart Application, Russian Application No. 2010106182, English Translation of Russian Notice of Allowance dated Dec. 2, 2011, 12 pages.

Foreign Communication From a Counterpart Application, PCT Application No. PCT/CN2008/072583, International Search Report dated Jan. 8, 2009, 9 pages.

Foreign Communication From a Counterpart Application, PCT Application No. PCT/CN2008/072583, English Translation of Written Opinion dated Jan. 8, 2009, 8 pages.

\* cited by examiner

METHOD, APPARATUS, AND SYSTEM FOR DISASTER RECOVERY OF IMS

CROSS-REFERENCE TO RELATED APPLICATIONS

This application is a continuation of U.S. patent application Ser. No. 15/830,946, filed on Dec. 4, 2017, which is a continuation of U.S. patent application Ser. No. 15/463,483, filed on Mar. 20, 2017, now U.S. Pat. No. 9,883,380, which is a continuation of U.S. patent application Ser. No. 13/350,654 filed on Jan. 13, 2012, now U.S. Pat. No. 9,661,028. The U.S. patent application Ser. No. 13/350,654 is a continuation of U.S. patent application Ser. No. 12/580,643 filed on Oct. 16, 2009, now U.S. Pat. No. 8,228,787, which is a continuation of International Patent Application No. PCT/CN2008/072583 filed on Sep. 28, 2008. The International Patent Application claims priority to Chinese Patent Application No. 200710167738.7 filed on Oct. 26, 2007 and Chinese Patent Application No. 200710030717.0 filed on Sep. 28, 2007. All of the aforementioned patent applications are hereby incorporated by reference in their entireties.

TECHNICAL FIELD

The present disclosure relates to Internet Protocol (IP) Multimedia Subsystem (IMS) network technologies, and in particular, to a method, apparatus, and system for disaster recovery of an IMS.

BACKGROUND

An IMS introduces an idea of separating control from bearer into an IP-based communication network. The IMS is a core in service processing of the communication network. High reliability of the IMS is the basis of high reliability of the entire communication network.

To improve reliability of the IMS, the network disaster recovery capability must be improved. An IMS network includes multiple network entities, between which there is a strong association. The network disaster recovery capability means that when a network device fails, the failure of the network device has the least impact on the entire IMS network and on users.

In some other approaches, after registering with an IMS network successfully, a user equipment (UE) starts a registration timer immediately according to a negotiated registration period, and re-registration of the UE is triggered when the registration timer expires. If a Serving Call Session Control Function (S-CSCF) that provides services for the user fails, a new S-CSCF may be assigned to the user through a mechanism of re-registration triggered by a registration timer.

According to the foregoing descriptions, when the S-CSCF that provides services for the user fails, the network service of the UE can be recovered after the registration timer of the user triggers re-registration and an S-CSCF is re-selected. That is, the service interruption duration of the UE depends on the registration period of the UE. The longer the registration period is, the longer the service interruption duration will be. To meet the reliability requirements of a telecom network, the registration period should be as short as possible. But if the registration period is set to a too small value, re-registration will occur frequently. With regard to the network, frequent re-registration increases the processing load of the network, and especially, frequent re-registration occupies valuable air-interface resources of a radio access network (RAN). With regard to the UE, frequent re-registration consumes the limited energy of the UE and shortens the standby time of the UE.

A solution to the foregoing problems is available in the other approaches. That is, during registration, the S-CSCF backs up the registration-related user data, such as the IMS Private User Identity (IMPI) information, IMS Public User Identity (IMPU) information, registered Contact address, and path information, to a Home Subscriber Server (HSS). When the S-CSCF fails and a UE uses the network, an Interrogating CSCF (I-CSCF) may select another S-CSCF to provide session services for the UE, and the new S-CSCF may obtain the user backup data of the IMPU that uses services in order to recover related services of the UE, thus implementing disaster recovery of the S-CSCF.

Currently, user identifiers (IDs) used in an IMS network mainly include an IMPI and an IMPU that are saved in an HSS in subscription mode. When a user performs a related service operation, the related entities in the network such as an I-CSCF, an S-CSCF, and an Application Server (AS) obtain the subscription data of the user through a user ID. In the IMS, the relation between user IDs and the relation between user IDs and subscription data are complex. As shown in FIG. 1, one IMS subscription includes all subscription information that may be transmitted by one UE on a Cx interface. One IMS subscription may include multiple IMPIs, but one IMPI belongs to only one IMS subscription, one IMPI may include multiple IMPUs, and one IMPU may be shared by multiple IMPIs. That is, the IMS subscription is in a one-to-many relation with the IMPI, and the IMPI is in a many-to-many relation with the IMPU. Therefore, the service logics such as one-IMPI multi-IMPU, one-IMPU multi-IMPI, and multi-IMPI multi-IMPU can be implemented flexibly.

When implementing the disclosure, the inventor finds at least the following problem in the foregoing technical solution to IMS disaster recovery. In the other approaches, no detailed recovery solution is worked out against the complex user data model in the IMS. Therefore, when adopting the foregoing technical solution, the one-IMPU multi-IMPI and multi-IMPI multi-IMPU services of users may be lost, thus reducing service continuity experiences of the users. For example, when the user data model shown in FIG. 2 is taken as an example, processing of the IMS disaster recovery solution in the other approaches is as follows.

Assuming that all IMPI and IMPU instances in the IMS subscription shown in FIG. 2 are registered on an S-CSCF1. If the S-CSCF1 fails and if a UE (IMPI1 and IMPU3) associated with the service performs periodic re-registration, a registration request is forwarded to an S-CSCF2 according to the foregoing technical solution. The S-CSCF2 registers the IMPI1 and IMPU3 successfully through a standard registration process and recovers user backup data of the IMPI1 and IMPU3 to the S-CSCF2. In addition, an HSS changes the server name saved for the IMS subscription from S-CSCF1 to S-CSCF2, and then may send a Registration Termination Answer (RTA) message to the original S-CSCF (S-CSCF1) to notify that a UE migration process is optional and that even if the RTA message is sent, the sending fails because of the failure of the original S-CSCF. Up to now, the disaster recovery process caused by UE (IMPI1 and IMPU3) registration is complete. If the IMPU3 is called: after receiving a call request, an I-CSCF searches the HSS for an S-CSCF (S-SCCF2) that serves the IMPU3 (in fact, the IMS subscription), the S-CSCF2 is in the normal state, and therefore, the I-CSCF does not add a disaster recovery flag to the call request, but routes the request to the S-CSCF2 directly, after receiving the request, the S-CSCF2 determines that the IMPU3 has a registered terminal IMPI1 locally, and that the call request does not contain a disaster recovery flag, so the S-CSCF2 does not perform disaster recovery, but analyzes whether to send the call request to the IMPI1, as a result, the one-IMPU multi-IMPI service (IMPI1 and IMPI2) of the IMPU3 is lost.

SUMMARY

Embodiments of the disclosure provide a method, apparatus, and system for disaster recovery of an IMS to prevent the one-IMPU multi-IMPI, one-IMPI multi-IMPU, or multi-IMPI multi-IMPU service that is associated with a complex user data model in the IMS from being lost during disaster recovery.

A method for disaster recovery includes triggering a redundant CSCF, and obtaining, by the redundant CSCF, user backup data of registered IMPIs that are associated with IMPUs and user service configuration data of the IMPUs in an IMS subscription from a network storage entity of a user. The method further includes recovering, by the redundant CSCF, a corresponding service according to the user backup data of the registered IMPIs and the user service configuration data of the IMPUs in the IMS subscription.

A method for backing up disaster recovery data includes starting, by a CSCF, disaster recovery data backup, and judging whether to back up registration subscription data. The method further includes backing up the registration subscription data if a judgment result is to back up registration subscription data.

A CSCF includes a start processing unit adapted to start disaster recovery data backup. The CSCF further includes a judgment processing unit adapted to judge whether to back up registration subscription data after the start processing unit starts disaster recovery data backup, and back up the registration subscription data if a judgment result is to back up registration subscription data.

A CSCF includes a disaster recovery data obtaining unit adapted to obtain user backup data of registered IMPIs that are associated with IMPUs and user service configuration data of the IMPUs in an IMS subscription from a network storage entity of a user after a service triggers disaster discovery. The CSCF further includes a disaster recovery processing unit adapted to recover a corresponding service according to the user backup data of the registered IMPIs and the user service configuration data of the IMPUs in the IMS subscription that are obtained by the disaster recovery data obtaining unit.

A network storage entity includes a user data storing unit adapted to store user service configuration data, user backup data for recovering user services, and information of a CSCF where a user is registered, and a disaster recovery data transmitting unit adapted to transmit the user backup data to a CSCF. The network storage entity further includes a message encapsulating unit adapted to encapsulate a response that carries information of registered IMPIs or IMPUs, and a message sending unit adapted to send the response that carries the information of registered IMPIs or IMPUs to a CSCF.

A network storage entity includes a user data storing unit adapted to store user service configuration data, user backup data for recovering user services, and information of a CSCF where a user is registered, and a disaster recovery processing unit. The disaster recovery processing unit includes a judging unit adapted to judge whether to perform disaster recovery for a CSCF, and a data transmitting unit adapted to transmit user backup data of registered IMPIs that are associated with the user and user service configuration data of the IMPUs in an IMS subscription to a redundant CSCF by interacting with the redundant CSCF once or many times if a judgment result of the judging unit is to perform disaster recovery for the CSCF.

An IMS includes a CSCF and a network storage entity. The network storage entity includes a user data storing unit adapted to store user service configuration data, user backup data for recovering user services, and information of a CSCF where a user is registered.

The network storage entity further includes a disaster recovery processing unit. The disaster recovery processing unit includes a judging unit adapted to judge whether to perform disaster recovery for a CSCF, and a data transmitting unit adapted to transmit user backup data of registered IMPIs that are associated with the user and user service configuration data of the IMPUs in an IMS subscription to a redundant CSCF by interacting with the redundant CSCF once or many times if a judgment result of the judging unit is to perform disaster recovery for a CSCF An IMS includes a CSCF and a network storage entity. The network storage entity includes a user data storing unit adapted to store user service configuration data, user backup data for recovering user services, and information of a CSCF where a user is registered, and a disaster recovery data transmitting unit adapted to transmit the user backup data to a CSCF.

The network storage entity further includes a message encapsulating unit adapted to encapsulate a response that carries information of registered IMPIs or IMPUs, and a message sending unit adapted to send the response that carries the information of registered IMPIs or IMPUs to a CSCF.

The CSCF includes a disaster recovery data obtaining unit adapted to obtain user backup data of registered IMPIs that are associated with IMPUs and user service configuration data of the IMPUs in an IMS subscription from a network storage entity of the user according to the information of registered IMPIs or IMPUs that is carried in the response returned by the network storage entity after a service triggers disaster recovery, and a disaster recovery processing unit adapted to recover a corresponding service of the user according to the user backup data of the registered IMPIs and the user service configuration data of the IMPUs in the IMS subscription that are obtained by the disaster recovery data obtaining unit.

In the foregoing solution, after a CSCF fails or is restarted, the user backup data of the registered IMPIs that are associated with the user and the user service configuration data of the IMPUs may be recovered by one-time service triggering of the user. User service configuration data of other registered IMPUs and user backup data of the IMPIs of the user not covered in this service triggering are recovered in time. Thus, the one-IMPU multi-IMPI, one-IMPI multi-IMPU, or multi-IMPI multi-IMPU service can be recovered, and this enables the user to have better service continuity experiences.

DETAILED DESCRIPTION OF THE EMBODIMENTS

User data required by disaster discovery must be backed up in advance. Multiple user data backup modes may be adopted. For example, when a UE is registered normally, an S-CSCF that provides services for the user sends the user backup data to a network storage entity such as an HSS through an extended Attribute-Value-Pair (AVP): User-Backup-Data in a registration Server Assignment Request (SAR). The network storage entity may store the user backup data. For example, the network storage entity may store the user backup data using the index of an IMPI. Only one piece of backup data needs to be stored for each IMPI.

In the foregoing process of implementing user data backup, the S-CSCF may back up data associated with user registration, including but not limited to a contact address and path information. In addition, the S-CSCF may back up the registration state subscription data of the UE, including but not limited to Call-ID, From, To, command sequence (Cseq), and Record-Route information.

Figure 1:
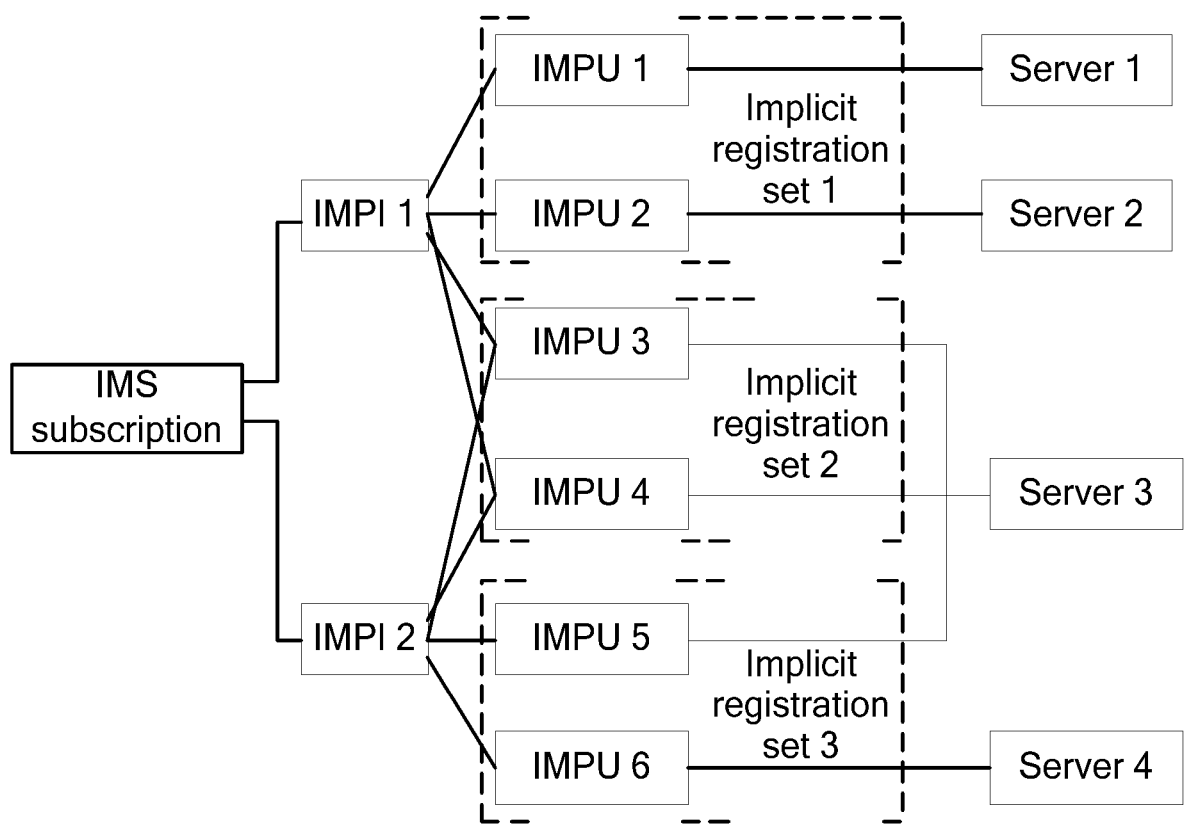
FIG. 1 shows a user data model.
Figure 2:
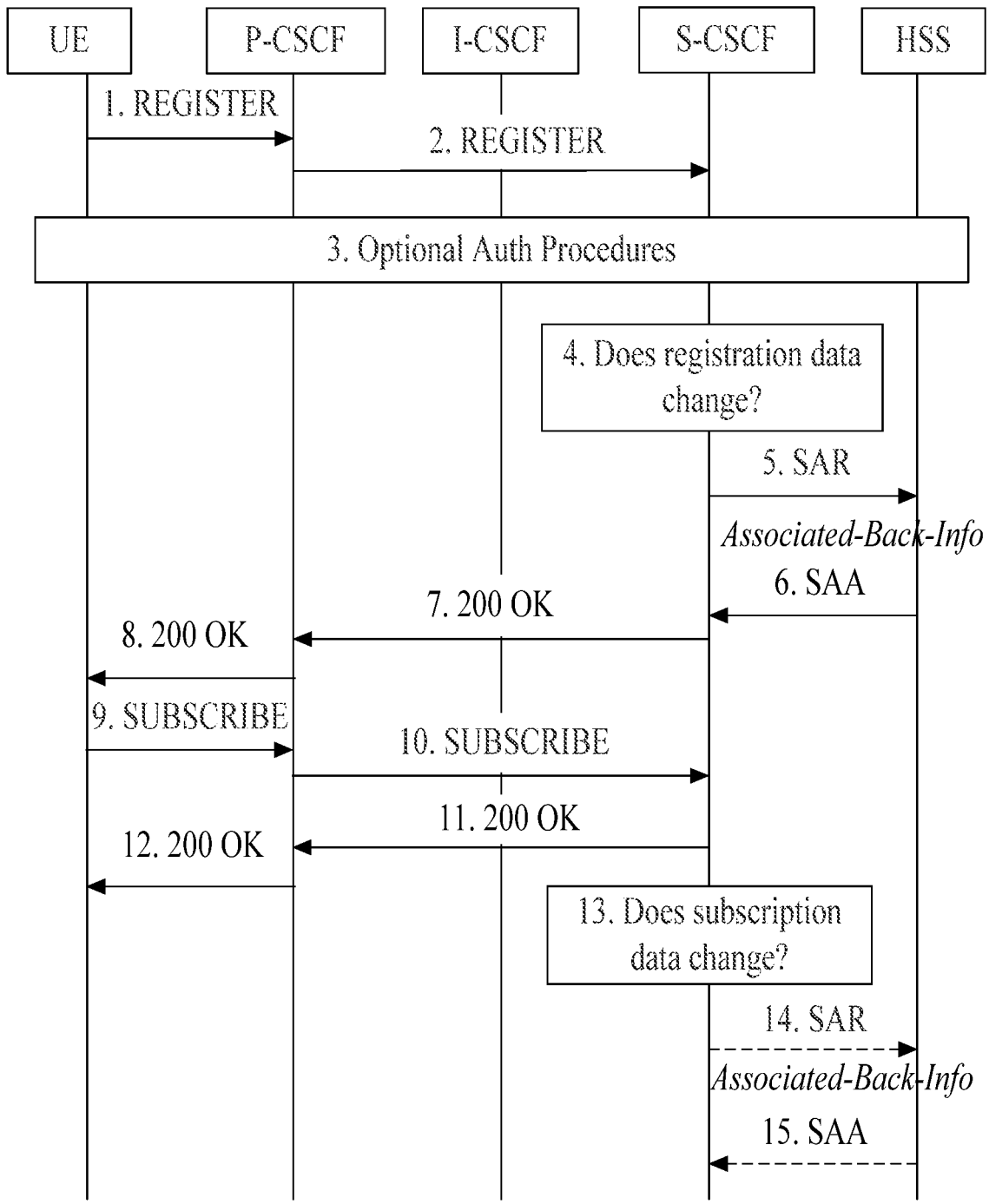
FIG. 2 is a flowchart of a method for backing up disaster recovery data according to an embodiment of the present disclosure.

The following describes a user data backup method required for disaster recovery provided in embodiments of the disclosure with reference to the accompanying drawings. In a disaster recovery data backup method provided in an embodiment of the disclosure shown in FIG. 2, an S-CSCF backs up the user backup data to a network storage entity HSS through a Cx interface message at appropriate time. The backup process includes the following steps.

Steps 1-3: An S-CSCF processes a registration request of a UE received through a proxy CSCF (P-CSCF) and an I-CSCF and accepts the registration request of the UE eventually.

Steps 4-6: The S-CSCF checks whether the key registration data of the UE changes.

(A): If the UE has not created registration information locally, registration information is created through this registration.

(B): If the UE has created registration information locally, but key registration data changes, for example, if either the registered Path information or the registered Contact information changes, or both the registered Path information and the registered Contact information change, the S-CSCF needs to back up the key registration data (Path information and Contact information) to the HSS through an SAR message (REGISTRATION or RE_REGISTRATION). In addition, if key registration subscription data (Call-ID, From, To, Cseq, and Record-Route information) is available, it also needs to be backed up.

If data is not backed up to the HSS in step 4, steps 5 and 6 may be omitted.

If the HSS stores the backup data of the registered UE and the SAR message (REGISTRATION or RE_REGISTRATION) does not carry backup data, the HSS may check whether the S-CSCF that originates a request is the same as the previously stored name of an S-CSCF. If not, the HSS may select to delete the stored backup data. This case may occur when the failed original S-CSCF has the capability of sending backup data but the new S-CSCF does not have such capability.

Steps 7 and 8: The S-CSCF returns a 200 OK message to the UE.

In addition, the key registration subscription data may be backed up during registration subscription. The process is as follows.

Steps 9-12: The S-CSCF receives a registration subscription request from the UE and accepts the registration subscription request, and then returns a subscription success message to the UE.

Steps 13-15: The S-CSCF checks whether the key registration subscription data of the UE changes.

(A): If the UE has not created subscription information locally, registration subscription information is created through this registration subscription.

(B): If the UE has created registration subscription information locally, but the key registration subscription data changes, for example, if one or more pieces of the registration subscription information such as Call-ID, From, To, and Record-Route information change, the S-CSCF backs up the foregoing key registration subscription data to the HSS through an SAR message (REGISTRATION, RE_REGISTRATION, or other newly extended service assignment type value). In addition, the S-CSCF may back up the key registration data to the HSS. In the request, the S-CSCF may set "User-Data-Already-Available" to "USER_DATA_ALREADY_AVAILABLE" to prevent the service configuration data from being sent again.

Figure 3:
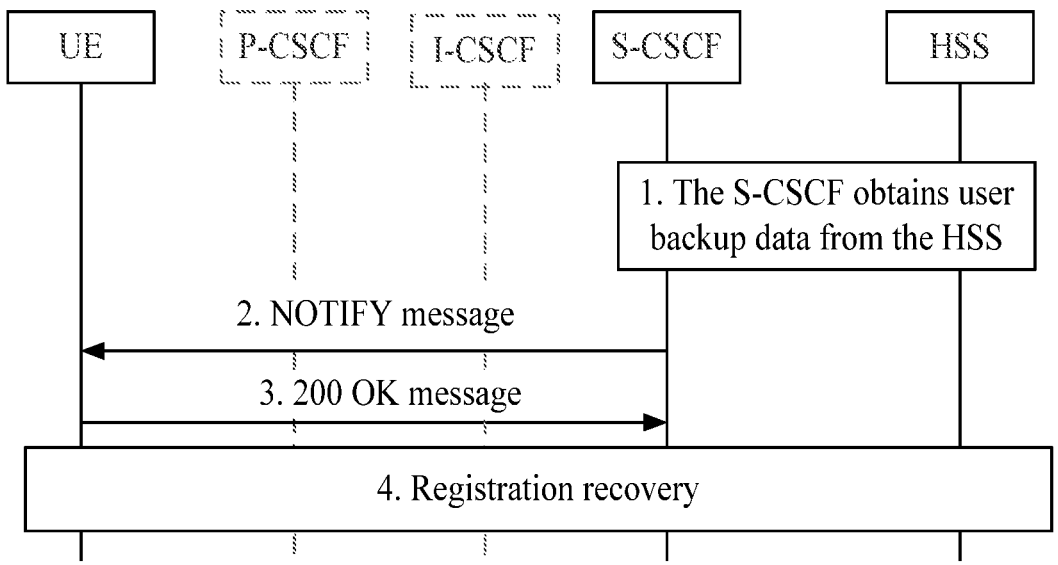
FIG. 3 is a flowchart in which a network notifies a UE of registration for recovering a service through the backup registration subscription data according to an embodiment of the present disclosure.

After the disaster recovery data is backed up, the new S-CSCF may notify the UE of re-registration by recovering the backup subscription data to recover all services of a UE when the original S-CSCF fails or is restarted. Thus, the one-IMPU multi-IMPI, one-IMPI multi-IMPU, or multi-IMPI multi-IMPU service can be recovered, and this enables the user to have better service continuity experiences. For example, a process of recovering UE services according to an embodiment of the present disclosure shown in FIG. 3 includes the following steps.

Step 1: After disaster recovery is triggered, an S-CSCF obtains user backup data from an HSS.

Step 2: The S-CSCF analyzes the registration subscription data contained in the user backup data. According to the registration subscription data, the S-CSCF sends a NOTIFY message to a UE to notify the UE of immediate registration.

Step 3: The UE returns a 200 OK message.

Step 4: According to the network indication, the UE originates registration immediately to recover network services.

In the foregoing process, when the network notifies the UE of registration through the NOTIFY message, in a given period of time, the S-CSCF may perform network deregistration for the UE, including deregistration of the related data in the HSS if the UE does not originate registration to the network.

It should be noted that when the S-CSCF requests the HSS to recover the service configuration data and backup data of an IMPU, the HSS may return the backup data of multiple IMPIs because one IMPU may be associated with multiple IMPIs. The backup data may be transmitted via a new AVP Associated-Back-Info in an extended SAA or PPR message. For example, by adding a new AVP named "Associated-Registered-Identities" to the SAA message, the HSS returns the information of all registered IMPIs that are associated with the IMPU, alternatively, by adding a flag bit to the original AVP: Associated-Identities, the HSS returns the information of the registered IMPIs that are associated with the IMPU.

During actual implementation, the Associated-Back-Info may adopt a composite AVP structure. The composite AVP structure is as follows:

Associated-Back-Info::=<AVP header: TBD>
{User-Name}
*{User-Backup-Data}

The foregoing AVP structure includes two AVPs, User-Name and User-Backup-Data. User-Name carries IMPI information, and User-Backup-Data carries the backup data of the IMPI carried in User-Name. When one IMPU is associated with multiple IMPIs, the HSS may return a message carrying multiple Associated-Back-Info AVPs.

Figure 4:
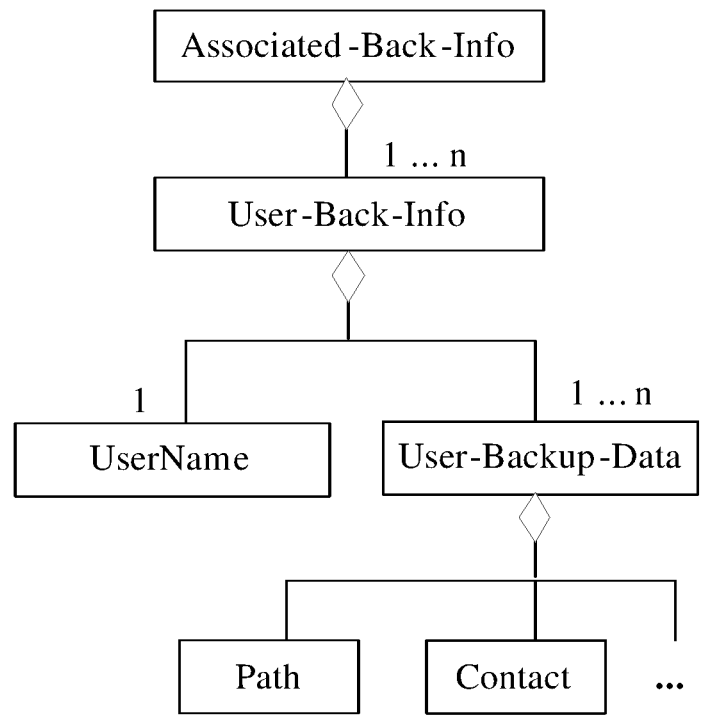
FIG. 4 shows a data model of an extended Server Assignment Answer (SAA) or Push Profile Request (PPR) message according to an embodiment of the present disclosure.

In an embodiment, Associated-Back-Info may be defined as an AVP containing text information. The data model is shown in FIG. 4. Each Associated-Back-Info instance includes one to n User-Back-Info instances. Each User-Back-Info instance includes one UserName instance and at least one User-Backup-Data instance. Each User-Backup-Data instance includes the backup data of the IMPI carried in UserName, at least the Path and Contact information associated with IMPI registration.

The method for disaster recovery is hereinafter described in detail with reference to exemplary embodiments and accompanying drawings.

Figure 5:
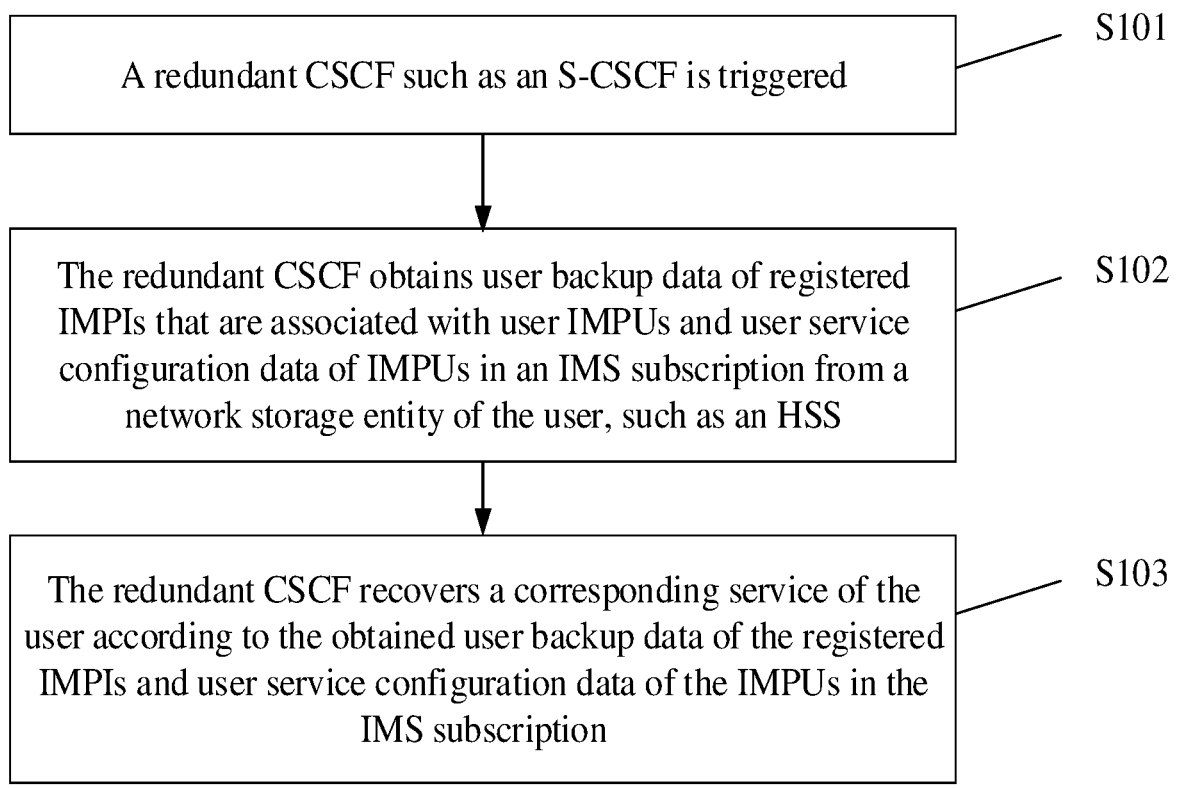
FIG. 5 is a flowchart of a method for disaster recovery according to an embodiment of the present disclosure.

As shown in FIG. 5, which is a flowchart of a method for disaster recovery in an embodiment of the disclosure, the process of disaster recovery includes the following steps.

Step S101: A redundant CSCF such as an S-CSCF is triggered. During actual implementation, when data is unavailable after the CSCF that provides services for a user fails or is restarted, disaster recovery may be triggered in each service process. For example, the redundant CSCF is triggered when the user originates a call or registration through a UE, or the redundant CSCF is triggered when the user terminates a call or when an AS originates a call in place of the UE. In addition, the redundant CSCF may be triggered in the short message service process or subscription service process.

Step S102: The redundant CSCF obtains user backup data of registered IMPIs that are associated with user IMPUs and user service configuration data of the IMPUs in an IMS subscription from a network storage entity of the user, such as an HSS. In this embodiment, during data recovery of a newly selected S-CSCF or successfully restarted S-CSCF, not only the service configuration data of the IMPUs and the user backup data of the IMPIs that are associated with this call or registration, but also the user backup data of all registered IMPIs that are associated with the user and the user service configuration data of the IMPUs in the IMS subscription are recovered.

Step S103: The redundant CSCF recovers a corresponding service of the user according to the obtained user backup data of registered IMPIs and user service configuration data of the IMPUs in the IMS subscription.

The following describes a method for disaster recovery with reference to embodiments in various application scenarios.

Figure 6:
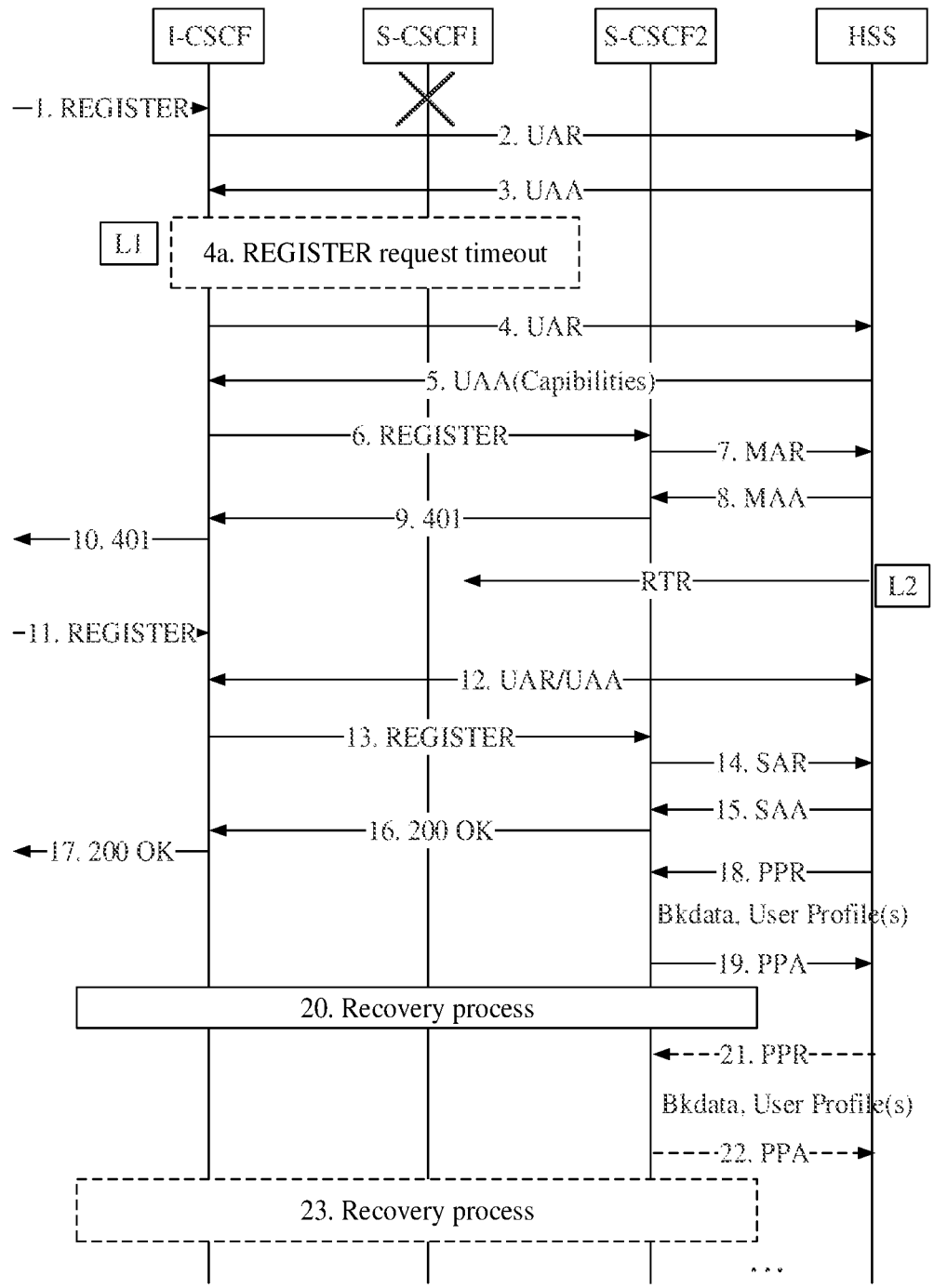
FIG. 6 is a flowchart of a method for disaster recovery according to a first embodiment of the present disclosure.

FIG. 6 is a flowchart of a method for disaster recovery according to a first embodiment of the disclosure.

In the first embodiment, an HSS judges whether all user data in an IMS subscription is completely recovered to a new S-CSCF (S-CSCF2, namely, redundant CSCF). If not, the HSS sends a PPR message to the new S-CSCF to push the user backup data and the user service configuration data to the new S-CSCF. An example of the application scenario where a service triggers disaster recovery is as follows. A user service origination process (such as a call service origination process) or a user service registration process triggers disaster recovery when the original S-CSCF (S-CSCF1) where a UE is registered fails. The UE may perform re-registration if the original S-CSCF of the UE is unavailable during the call origination process.

As shown in FIG. 6, the UE is registered (from step 1. REGISTER to step 17. 200 OK). The registration process is the same as the IMS standard process.

Step L2: According to the standard process, the HSS may send a Registration Termination Request (RTR) message to the original S-CSCF (S-CSCF1) of the UE after changing ServerName according to a Multimedia-Authentication-Request (MAR) message. In the first embodiment, after the HSS sends the RTR (i.e., SERVER_CHANGE) message to other associated registered UEs that are affected, the HSS does not change the registration state of the UE if the original S-CSCF (S-CSCF1) of the UE does not respond, and if the HSS knows that the original S-CSCF (S-CSCF1) of the UE fails through a failure detection mechanism, the HSS does not need to send the RTR message and does not need to change the UE registration state.

In the first embodiment, when the S-CSCF1 fails (for example, the S-CSCF1 does not respond to the RTR message or the S-CSCF1 failure is detected through the failure detection mechanism), the HSS sends a PPR message (step 18. PPR) to the S-CSCF2 in order to recover the user data in an IMS subscription. Compared with the standard PPR message, the sent PPR message contains an additional AVP:User-Backup-Data, which is used to carry user backup data and instruct the S-CSCF2 to perform disaster recovery for the user information in the PPR message.

Generally, one PPR message carries only one user profile, which is encapsulated into one AVP:User-Data, that is, one PPR message carries only one User-Data. The HSS needs to send a PPR message carrying user backup data to different implicit registration sets when multiple IMPUs registered by one IMPI are in different implicit registration sets.

To decrease message traffic on a Cx interface, an embodiment of the disclosure provides another optional extension mode to reduce repeated transmission of backup data. That is, in a PPR message, multiple AVPs named User-Data can be carried, and each User-Data contains the user service configuration data (service profile) of all IMPUs in one implicit registration set. Thus, the user backup data of one IMPI and service profiles of all the registered IMPUs associated with the IMPI can be recovered by exchanging a PPR message once. The user service configuration data determines the type of a user application service.

After receiving the PPR message, the S-CSCF2 stores the user backup data and the user service configuration data carried in the PPR message, and returns a Push Profile Answer (PPA) message (i.e., step 19. PPA) to the HSS. The S-CSCF2 performs recovery operations for the user according to the user backup data and the user service configuration data carried in the PPR message, for example, the S-CSCF2 sends a NOTIFY message to the UE to trigger immediate re-registration (i.e., step 20. recovery processing), alternatively, when a service request associated with the user is available, the S-CSCF2 judges the type of the user application service according to the user service configuration data and performs service recovery according to the user backup data.

If other registered IMPUs or IMPIs that are affected in the HSS need to be recovered, repeat steps 18-20 until the data of all registered IMPUs and IMPIs is recovered (i.e., step 21. PPR to step 23 recovery process).

It should be noted that an example application scenario where a service triggers disaster recovery is as follows. The recovery process caused by the call origination of a non-migrated user on the S-CSCF results in UE re-registration when the original S-CSCF where a UE is registered is restarted. The process of recovering a user service through registration is similar to that in the first embodiment.

Figure 7:
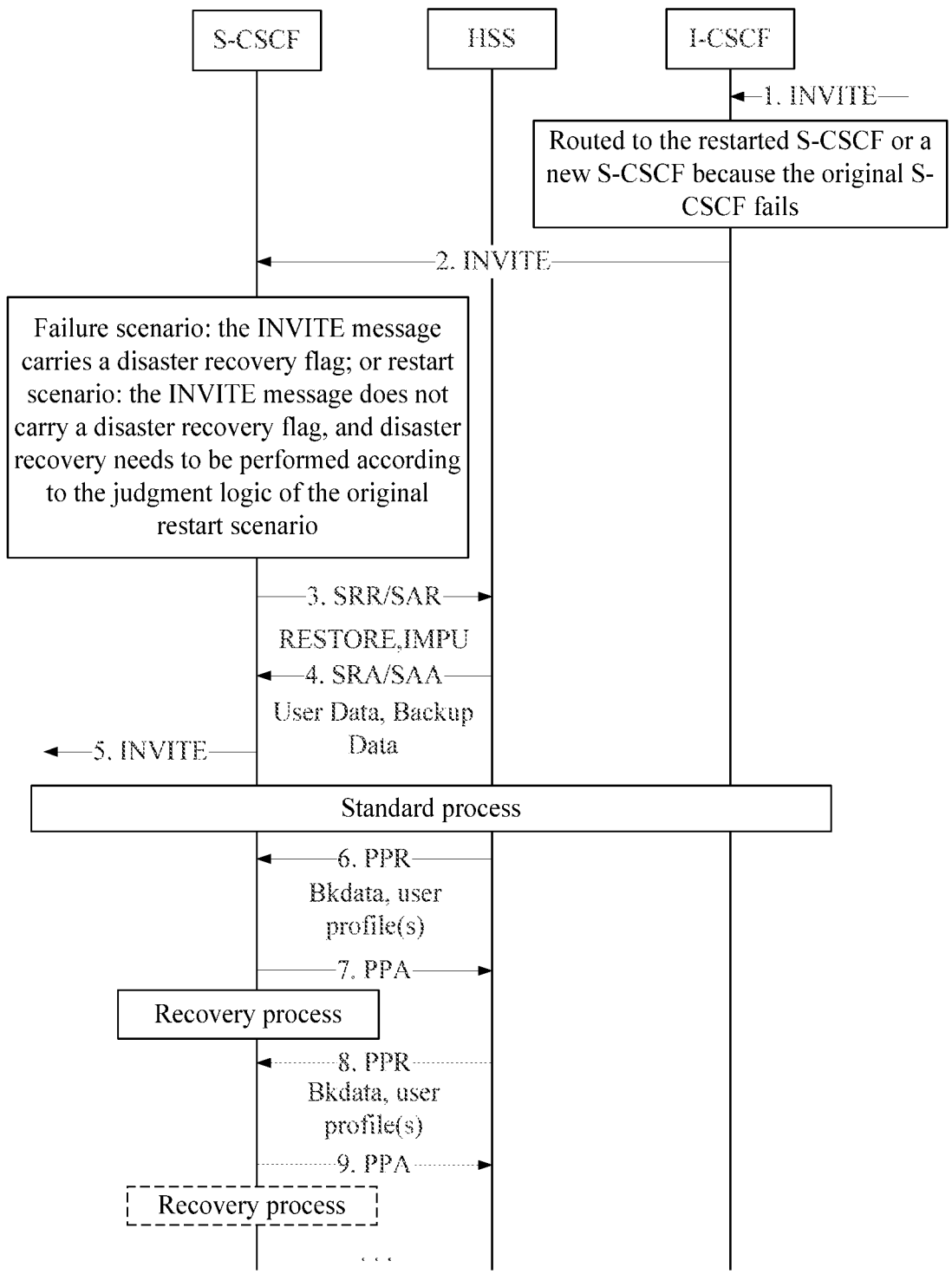
FIG. 7 is a flowchart of a method for disaster recovery according to a second embodiment of the present disclosure.

FIG. 7 is a flowchart of a method for disaster recovery according to a second embodiment of the disclosure.

In the second embodiment, an HSS judges whether all user backup data in an IMS subscription is completely recovered to a new S-CSCF. If not, the HSS sends a PPR message to the new S-CSCF to push the user backup data and the user service configuration data to the new S-CSCF. An example of the application scenario where a service triggers disaster recovery is as follows. The original S-CSCF where a UE is registered fails or is restarted, and call termination by the UE or call origination by an AS in place of the UE triggers disaster recovery.

As shown in FIG. 7, the process of disaster recovery includes the following steps.

Steps 1-5: After receiving a service termination request from a UE or a service origination request from an AS in place of the UE (i.e., an INVITE message), an I-CSCF sends a query message to an HSS to obtain the current S-CSCF If the current S-CSCF fails, the I-CSCF interacts with the HSS to select another S-CSCF, and then forwards the service request with a disaster recovery flag to the new S-CSCF, if the current S-CSCF indicated by the HSS is restarted successfully after it fails, the I-CSCF forwards the service request to the successfully restarted S-CSCF.

The S-CSCF (redundant S-CSCF) that receives the service request determines that disaster recovery needs to be performed according to the disaster recovery flag in the received service request. Alternatively, the service request may not carry a disaster recovery flag, and when the redundant S-CSCF finds that the UE is not registered locally, the redundant S-CSCF sends an SAR (UNREGISTERED_USER) message to the HSS. After receiving the message, the HSS finds that the UE is in the non-UNREGISTERED state, and then returns an SAA (DIAMETER_ERROR_IN_ASSIGNMENT_TYPE) message. The redundant S-CSCF may perform disaster recovery after receiving the SAA (DIAMETER_ERROR_IN_ASSIGNMENT_TYPE) message.

Steps 6-7: The HSS can determine that the redundant S-CSCF needs to recover user data according to the RESTORE request originated by the redundant S-CSCF in step 3, and then send a PPR message to recover user data (which is similar to steps 18 and 19 in the first embodiment (i.e., FIG. 6)).

When the AS originates a call in place of the UE, the call may reach the S-CSCF without passing through the I-CSCF, and disaster recovery may be performed in two cases.

Case (1): If the S-CSCF obtained from the HSS cannot be contacted, the AS may route a session to the I-CSCF for subsequent routing. The disaster recovery process is the same as above.

Case (2): If the S-CSCF obtained from the HSS can be contacted, but the S-CSCF is restarted, user data may be lost. The S-CSCF determines that user data needs to be recovered from the HSS according to the logic of a restart scenario. For other processing steps (i.e., steps 8 and 9), see steps 6 and 7.

Figure 8:
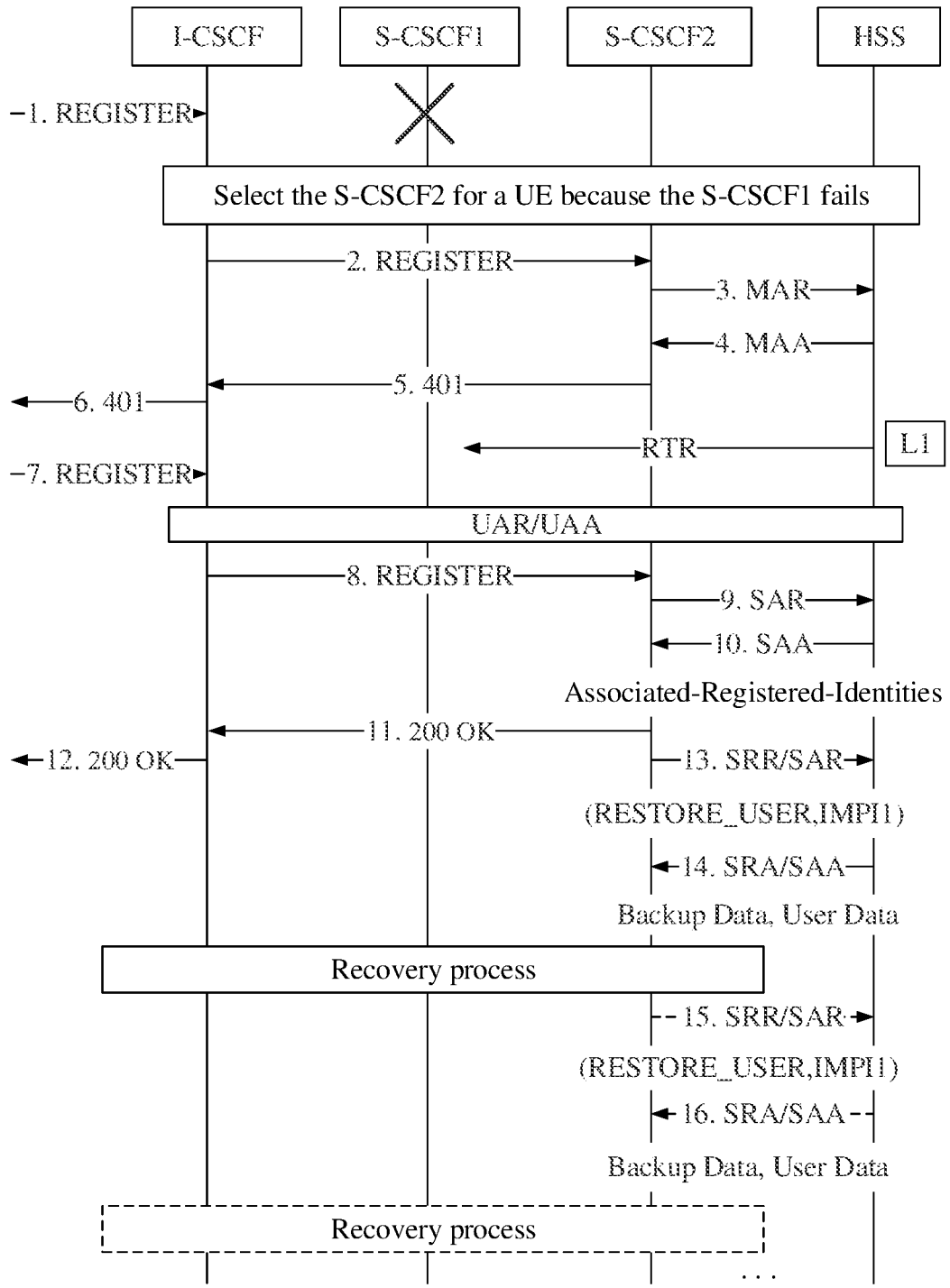
FIG. 8 is a flowchart of a method for disaster recovery according to a third embodiment of the present disclosure.

FIG. 8 is a flowchart of a method for disaster recovery according to a third embodiment of the disclosure.

In the third embodiment, an S-CSCF determines that disaster recovery needs to be performed. The mode of originating a user data request to an HSS for several times may be adopted to recover the user data in an IMS subscription, and the index of the originated request is an IMPI. An example of an application scenario where a service triggers disaster recovery is as follows. The original S-CSCF (i.e., S-CSCF1) where a UE is registered fails, and call origination by the UE or registration of the UE triggers disaster recovery, if the original S-CSCF is unavailable when the UE originates a call, the UE performs re-registration.

As shown in FIG. 8, the process of disaster recovery includes the following steps.

Steps 1-6: A UE is registered in a process of switching from S-CSCF1 to S-CSCF2 (redundant S-CSCF).

Step L1: This step is the same as step L2 in the first embodiment. If an HSS does not detect that the S-CSCF1 fails, the HSS sends an RTR message, if the HSS does not receive an RTA message, the HSS does not change the registration state of the UE.

Steps 7-9: The UE originates a registration request, an I-CSCF sends a registration request to the S-CSCF2 by exchanging a User-Authorization-Request (UAR) or User-Authorization-Answer (UAA) message with the HSS, and the S-CSCF2 sends an SAR message to the HSS after authenticating the UE.

Step 10: The HSS sends an SAA message to the S-CSCF2, carrying the information of all registered IMPIs in an IMS subscription in addition to Associated-Identities (all IMPIs in the IMS subscription). In the third embodiment, the information of the registered IMPIs can be returned by adding AVP:Associated-Registered-Identities or adding a flag bit to the original AVP:Associated-Identities.

Steps 11-12: The S-CSCF returns a 200 OK message to the UE after receiving the SAA message.

Step 13: After obtaining the list of registered IMPIs, the S-CSCF2 checks the local registered UEs in the IMS subscription. If the registered UEs indicated in the registered IMPI user information that is provided by the HSS are not registered in the S-CSCF2, the S-CSCF2 may send a Service Restore Request (SRR) or SAR message carrying disaster recovery indication information to the HSS. The SRR or SAR message carries one IMPI that is not registered in the list of registered IMPIs in order to request the HSS to recover the user backup data of the IMPI.

Step 14: After receiving the request for recovering the user data of the unregistered IMPI in the list of registered IMPIs, the HSS returns a response carrying the user backup data of the IMPI and the user service configuration data of the IMPU associated with the IMPI.

In the third embodiment, a service request acknowledgement (SRA) or SAA message can be extended such that it may carry multiple User-Data AVPs, thus returning the user service configuration data of the IMPUs that are associated with one IMPI but belong to different implicit registration sets.

After the S-CSCF receives the response, the S-CSCF performs recovery operations according to the backup data in the response.

Steps 15-16: If the list of registered IMPIs returned in step 10 contains multiple IMPIs, the recovery operations in steps 13 and 14 can be performed for each IMPI.

Figure 9:
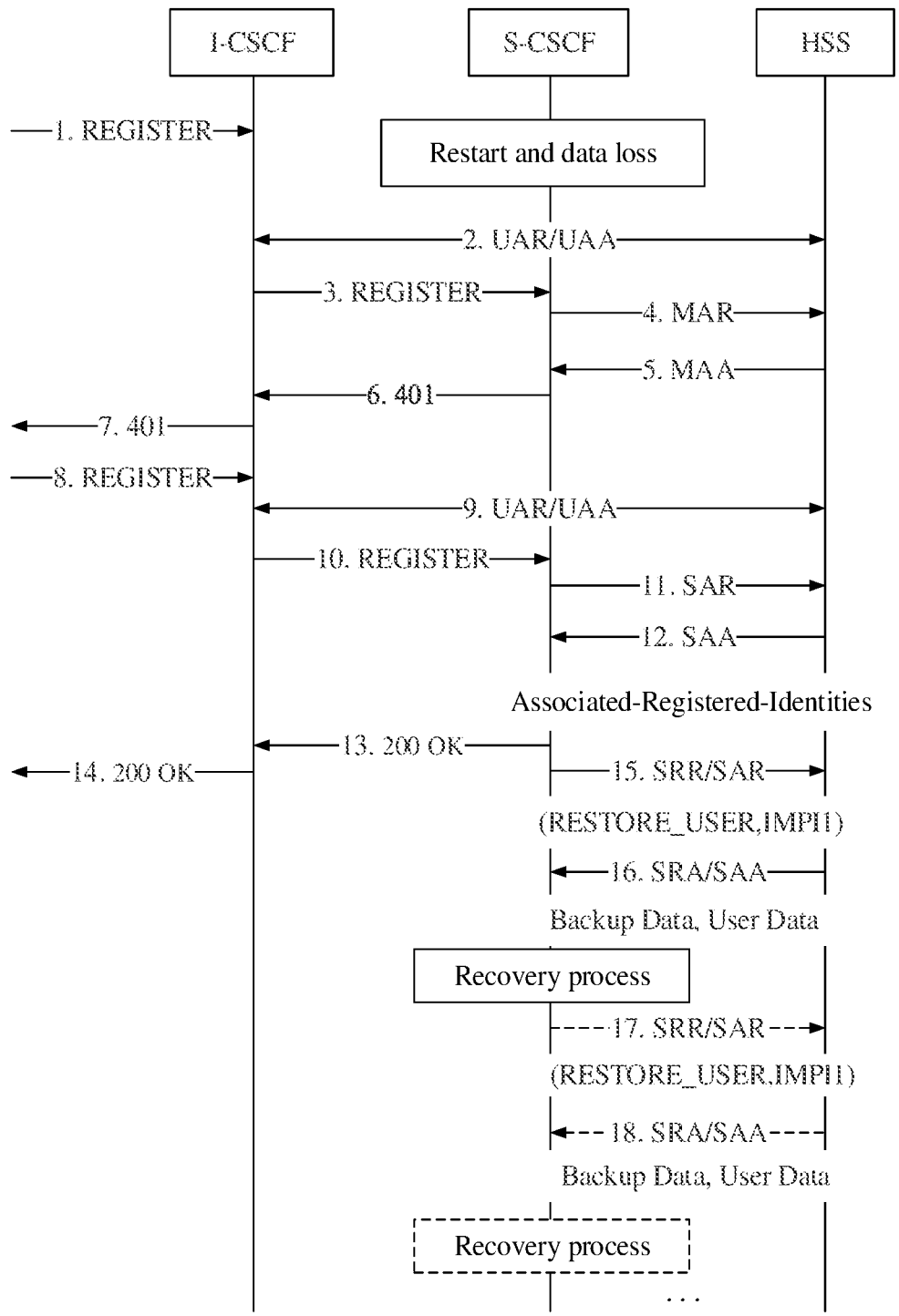
FIG. 9 is a flowchart of a method for disaster recovery according to a fourth embodiment of the present disclosure.

FIG. 9 is a flowchart of a method for disaster recovery according to a fourth embodiment of the disclosure.

In the fourth embodiment, an S-CSCF determines that disaster recovery needs to be performed. The mode of originating a user data request to an HSS for several times may be adopted to recover the user data in an IMS subscription, and the index of the originated request is an IMPI. An example of an application scenario where a service triggers disaster recovery is as follows. The S-CSCF is restarted, and call origination by a UE or registration of the UE triggers disaster recovery, if the S-CSCF is restarted and the user data of the caller is unavailable when the UE originates a call, the UE performs re-registration.

As shown in FIG. 9, the process of disaster recovery includes the following steps.

Steps 1-11: A UE originates a registration request after an S-CSCF is successfully restarted, an I-CSCF sends a registration request to the restarted S-CSCF by exchanging a UAR or UAA message with an HSS, and the S-CSCF sends an SAR message to the HSS after authenticating the UE.

Steps 12-18: These steps are the same as steps 10-16 in the third embodiment (i.e., FIG. 8). The restarted S-CSCF can completely recover all user data in an IMS subscription.

Figure 10:
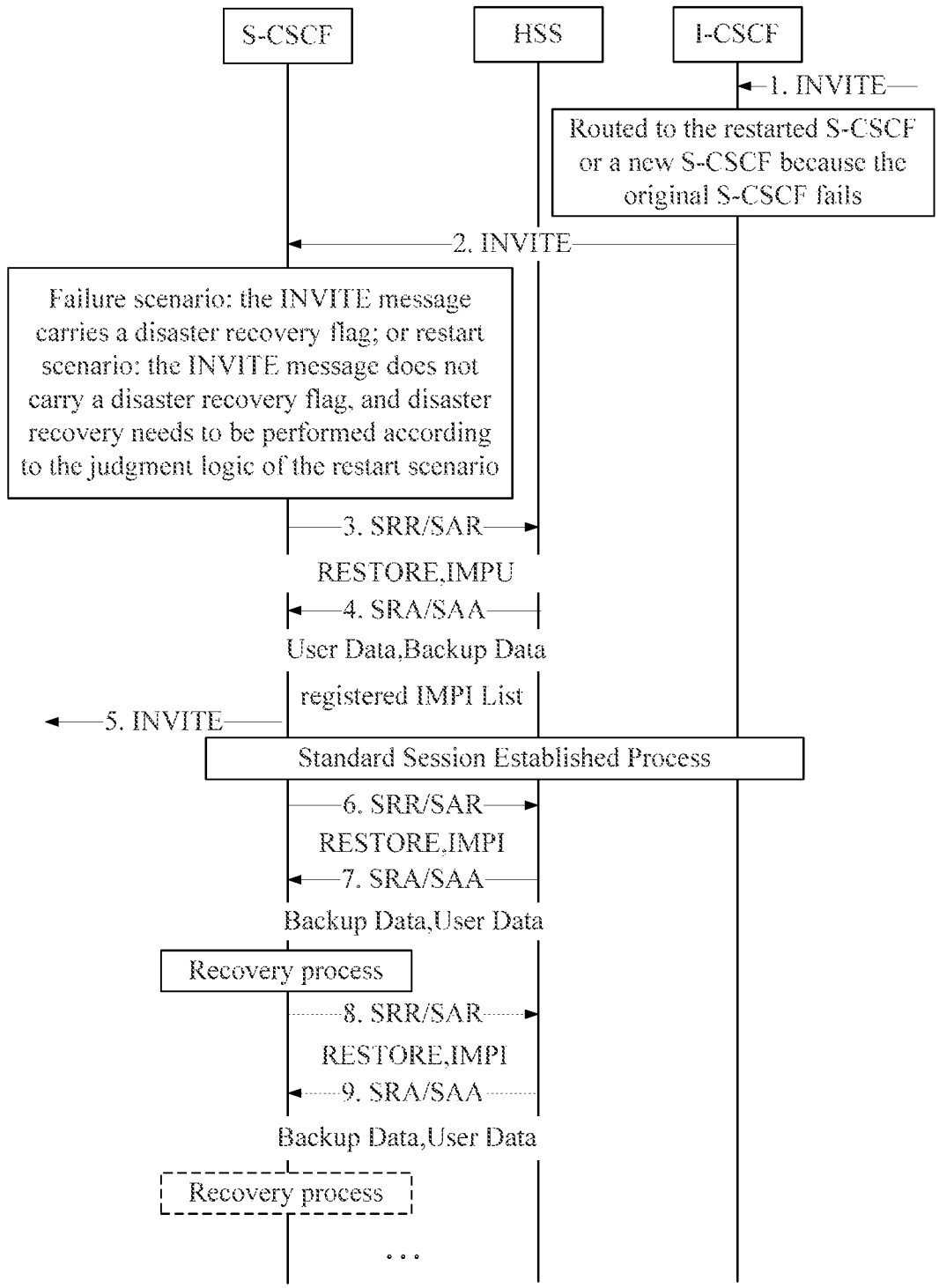
FIG. 10 is a flowchart of a method for disaster recovery according to a fifth embodiment of the present disclosure.

FIG. 10 is a flowchart of a method for disaster recovery according to a fifth embodiment of the disclosure.

In the fifth embodiment, an S-CSCF determines that disaster recovery needs to be performed. The mode of originating a user data request to an HSS for several times may be adopted to recover the user data in an IMS subscription, and the index of the originated request is an IMPI. An example of an application scenario where a service triggers disaster recovery is as follows. The S-CSCF fails or is restarted, and call termination by the UE or call origination by an AS in place of the UE through an I-CSCF triggers disaster recovery.

As shown in FIG. 10, the process of disaster recovery includes the following steps.

Steps 1-3: After receiving a service termination request from a UE or a service origination request from an AS in place of the UE (i.e., an INVITE message), an I-CSCF sends a query message to an HSS to obtain the current S-CSCF. If the current S-CSCF fails, the I-CSCF interacts with the HSS to select another S-CSCF, and then forwards the service request with a disaster recovery flag to the new S-CSCF, if the current S-CSCF indicated by the HSS is restarted successfully after it fails, the I-CSCF forwards the service request to the successfully restarted S-CSCF.

The S-CSCF that receives the service request determines that disaster recovery needs to be performed according to the disaster recovery flag in the received service request. Alternatively, the service request may not carry a disaster recovery flag, and when the S-CSCF finds that the UE is not registered locally, the S-CSCF sends an SAR (UNREGISTERED_USER) message to the HSS. After receiving the message, the HSS finds that the UE is in the non-UNREGISTERED state, and then returns an SAA (DIAMETER_ERROR_IN_ASSIGNMENT_TYPE) message. The S-CSCF may perform disaster recovery after receiving the SAA (DIAMETER_ERROR_IN_ASSIGNMENT_TYPE) message.

Step 4: In the disaster recovery response from the HSS, in addition to the service profile of the IMPU or the service profiles of all IMPUs in the implicit registration set of the IMPU, and the user backup data of IMPIs, the information of the registered IMPIs in an IMS subscription needs to be returned. In the fifth embodiment, for example, AVP:Associated-Registered-Identities may be added to the recovery response to carry the information of the registered IMPIs.

Steps 6-9: The steps are the same as steps 13-16 (recovery processing) in the third embodiment (i.e., FIG. 8).

When the AS originates a call in place of the UE, the call may reach the S-CSCF without passing through the I-CSCF, and disaster recovery may be performed in two cases.

Case (1): If the S-CSCF obtained from the HSS cannot be contacted, the AS may route a session to the I-CSCF for subsequent routing. The subsequent disaster recovery process is the same as above.

Case (2): If the S-CSCF obtained from the HSS can be contacted, but the S-CSCF is restarted, user data may be lost. The S-CSCF determines that user data needs to be recovered from the HSS according to the logic of a restart scenario.

Figure 11:
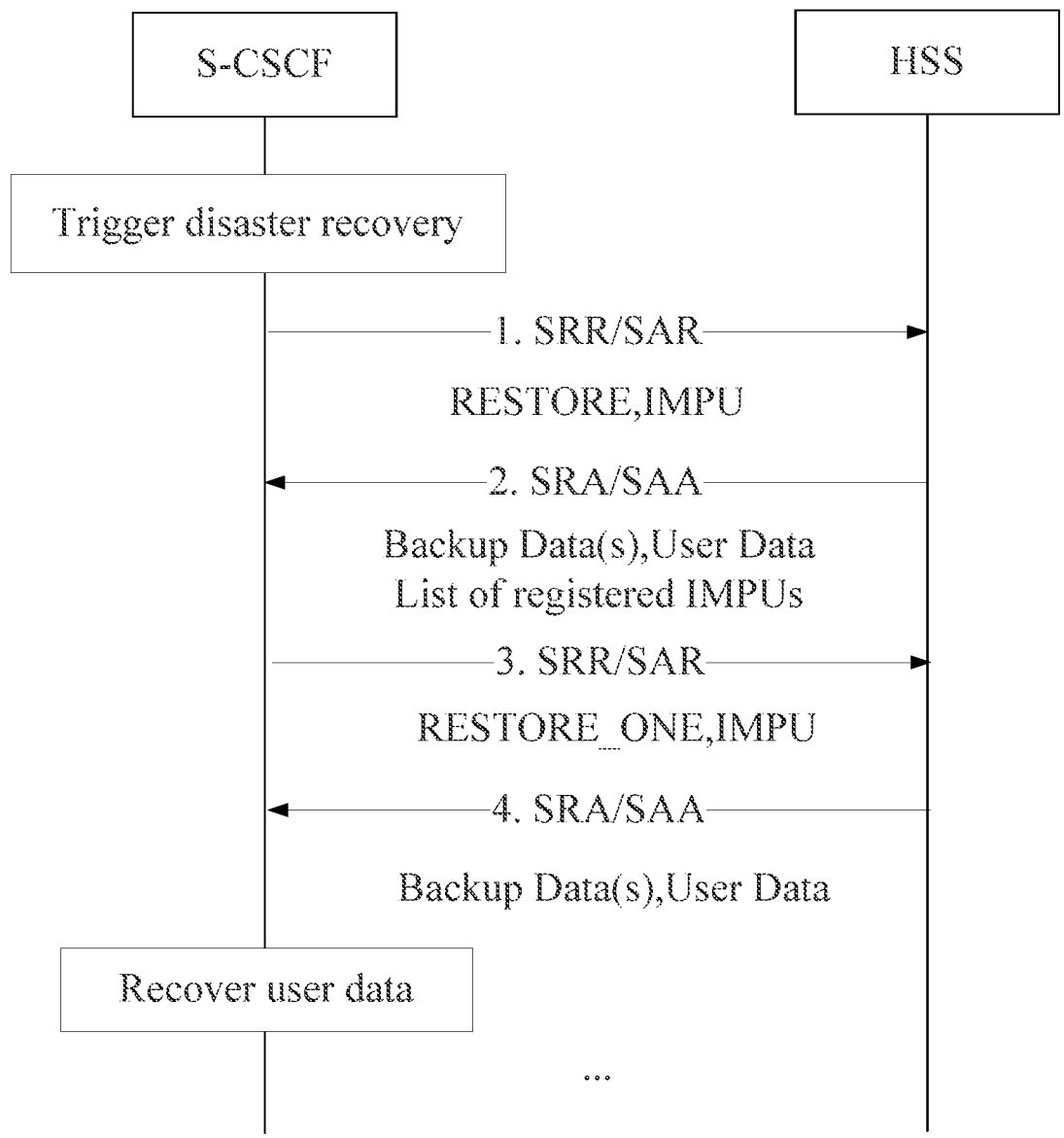
FIG. 11 is a flowchart of a method for disaster recovery according to a sixth embodiment of the present disclosure.

In addition, a disaster recovery request can be originated with the index of an IMPU, according to the method for disaster recovery according to a sixth embodiment of the disclosure shown in FIG. 11.

In the sixth embodiment, an S-CSCF determines that disaster recovery needs to be performed. The mode of originating a disaster recovery user data request to an HSS for several times may be adopted to recover the user data in an IMS subscription, and the index of the originated request is an IMPU. The sixth embodiment may be applicable to various service triggering processes, such as a calling or called service triggering process originated by a UE or a calling recovery triggering process originated by an AS in place of the UE. The service triggering processes are not described in detail. Only the method for completely recovering IMS subscription data is described.

As shown in FIG. 11, the process of completely recovering IMS subscription data includes the following steps.

Step 1: A redundant S-CSCF sends an SRR or SAR message to an HSS.

Step 2: The HSS returns an SRA or SAA message, carrying the backup data of all registered IMPIs that are directly associated with the IMPU carried in the SRR or SAR message, through the AVP:User-Data, the HSS returns the user service configuration data of all IMPUs in the UE or implicit registration set of the IMPU. In addition, the HSS returns the list of other registered IMPUs in an IMS subscription.

Step 3: The S-CSCF recovers the user data carried in the SRA or SAA message. After obtaining the list of registered IMPUs, the S-CSCF recovers the complete data of the IMPUs one by one through Server-Assignment-Type in the extended SAR message, for example, the S-CSCF adds a new operation type (RESTORE_ONE) to the SAR message in order to request the HSS to recover the complete data of the IMPUs one by one.

Step 4: After receiving the SAR message of the RESTORE_ONE type, the HSS returns the backup data (User-Backup-Data) of all registered IMPIs that are directly associated with the IMPU carried in the SAR message. Through the User-Data AVP, the HSS returns the user profile of the UE of the IMPU or the UE in the implicit registration set of the IMPU. The S-CSCF recovers user data according to the data.

If the IMPU list returned in step 2 contains multiple IMPUs, the recovery operations in steps 3 and 4 are performed for each IMPU.

Figure 12:
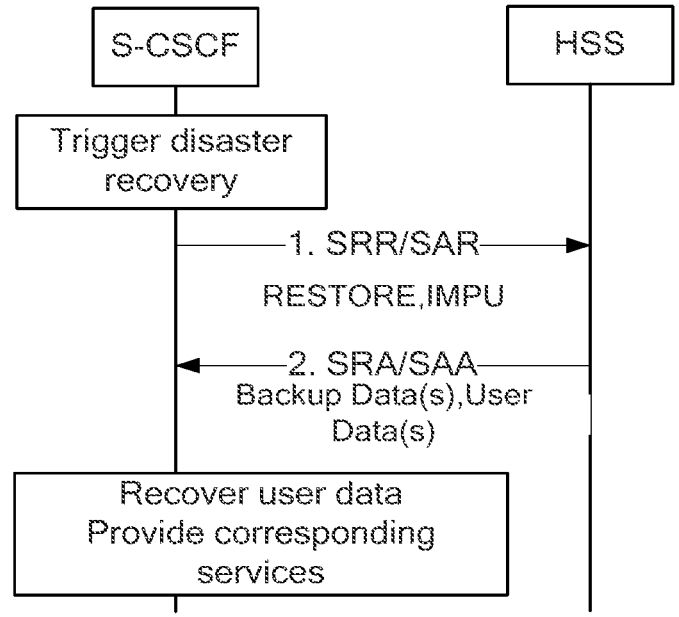
FIG. 12 is a flowchart of a method for disaster recovery according to a seventh embodiment of the present disclosure.

FIG. 12 is a flowchart of a method for disaster recovery according to a seventh embodiment of the disclosure.

The seventh embodiment is different from the foregoing embodiments. In this embodiment, the S-CSCF recovers all user backup data in an IMS subscription through one-time disaster recovery. The seventh embodiment may be applicable to various service triggering processes. The service triggering processes are not described in detail.

As shown in FIG. 12, the process of recovering all user backup data in an IMS subscription through one-time disaster recovery may be implemented through the following steps.

Step 1: An S-CSCF sends an SRR or SAR message to an HSS.

Step 2: The HSS queries for the registration instances of all IMPIs and IMPUs in an IMS subscription of the IMPU carried in the SRR or SAR message, and then returns all user backup data and user service configuration data in the registration instances to the S-CSCF through an SRA or SAA message.

In this embodiment, the SRA or SAA message needs to be extended to support multiple AVPs with the name of User-Data. The contents encapsulated in each User-Data comply with the specified standard, and the contents include Private Identity, IMPUs in the related implicit registration set, and service profiles of these IMPUs.

Figure 13:
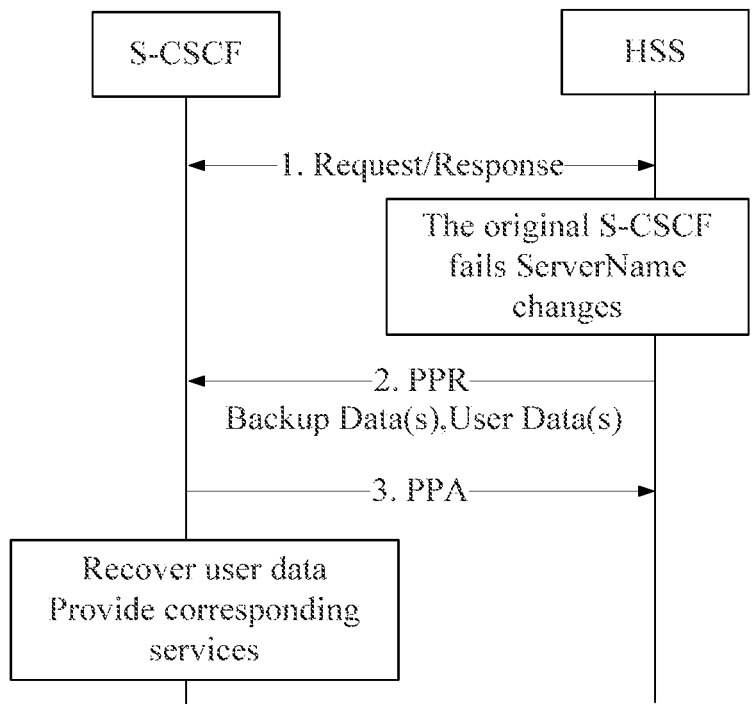
FIG. 13 is a flowchart of a method for disaster recovery according to an eighth embodiment of the present disclosure.

FIG. 13 is a flowchart of a method for disaster recovery according to an eighth embodiment of the disclosure.

The eighth embodiment is different from the first to sixth embodiments. In the eighth embodiment, the S-CSCF recovers all data in an IMS subscription through one-time disaster recovery, and the HSS recovers all user backup data in an IMS subscription through a PPR or PPA message. The eighth embodiment may be applicable to various service triggering processes. The service triggering processes are not described in detail.

As shown in FIG. 13, the process of recovering all user backup data in an IMS subscription through one-time disaster recovery may be implemented through the following steps.

Step 1: An S-CSCF interacts with an HSS through an MAR or MAA, SRR or SRA, or SAR or SAA message.

Step 2: The HSS may change ServerName by exchanging an MAR or MAA message and determine that the original S-CSCF fails (for example, no response is returned when an RTR message is sent). Then, the HSS sends all user backup data and user service configuration data in an IMS subscription of the affected IMPU to a redundant S-CSCF through a PPR message.

Alternatively, the HSS may know that the current scenario is a disaster recovery scenario by exchanging an SRR or SRA or SAR or SAA message. Then, the HSS sends all user backup data and user service configuration data in the IMS subscription of the affected IMPU to the redundant S-CSCF through a PPR message.

The S-CSCF returns PPA message.

It should be noted that in the foregoing implementation process, the PPR message needs to be extended to support multiple AVPs with the name of User-Data. The contents encapsulated in each User-Data comply with the specified standard, and the contents include Private Identity, related IMPUs in the implicit registration set, and service profiles of these IMPUs.

Therefore, in the first to eighth embodiments, when the method for recovering the user backup data and user service data in an IMS subscription once is adopted, user service configuration data of other registered IMPUs and user backup data of IMPIs of the user not covered in this service triggering are recovered in time. Thus, the one-IMPU multi-IMPI, one-IMPI multi-IMPU, or multi-IMPI multi-IMPU service can be recovered, and this enables the user to have better service continuity experiences.

Figure 14:
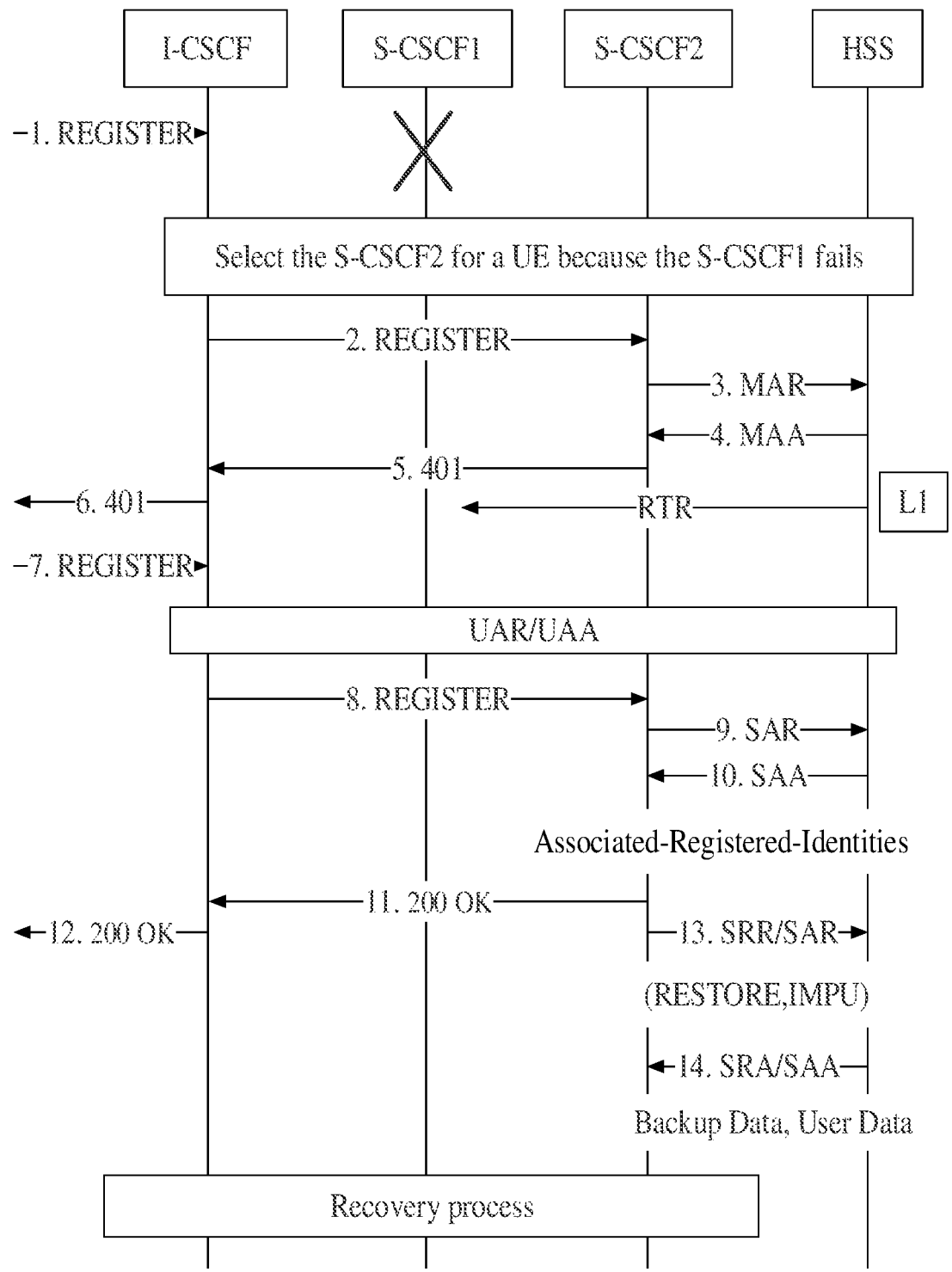
FIG. 14 is a flowchart of a method for disaster recovery according to a ninth embodiment of the present disclosure.

FIG. 14 is a flowchart of a method for disaster recovery according to a ninth embodiment of the disclosure.

In the ninth embodiment, an S-CSCF determines that disaster recovery needs to be performed. The service data of one IMPU, service data of IMPUs in the implicit registration set of the IMPU, and backup data of all registered IMPIs that are associated with the IMPU are recovered once. An example of an application scenario where a service triggers disaster recovery is as follows. The S-CSCF fails, and call origination by a UE or registration of the UE triggers disaster recovery, if the original S-CSCF is unavailable when the UE originates a call, the UE performs re-registration.

As shown in FIG. 14, the process of disaster recovery includes the following steps.

Steps 1-6: A UE is registered in a process of switching from the S-CSCF1 to a new S-CSCF (S-CSCF2).

Step L: This step is the same as step L2 in the first embodiment. If an HSS does not detect that the original S-CSCF (S-CSCF1) where the UE is registered fails, the HSS sends an RTR message to the original S-CSCF of the UE, if the HSS does not receive an RTA message, the HSS does not change the registration state of the UE.

Steps 7-9: The UE originates a registration request, an I-CSCF sends a registration request to the S-CSCF2 by exchanging a UAR or UAA message with the HSS, and the S-CSCF2 originates an SAR message to the HSS after authenticating the UE.

Step 10: The HSS returns an SAA message to the S-CSCF2, carrying the information of the registered IMPIs that are directly associated with the IMPU carried in the SAR message. If no registered IMPIs are associated with the IMPU except the IMPIs carried in the SAR message, the HSS does not need to return the information of the registered IMPIs. In the ninth embodiment, the information of the registered IMPIs that are associated with the IMPU can be returned by adding an AVP:Associated-Registered-Identities or adding a flag bit to the original AVP:Associated-Identities.

If the HSS does not return the information of the registered IMPIs that are associated with the IMPU, step 13 and the subsequent are not required.

Step 13: After obtaining the list of registered IMPIs, the S-CSCF2 checks the registered IMPIs that are associated with the IMPU locally. If the registered IMPIs provided by the HSS are not registered in the S-CSCF2, the S-CSCF2 may send an SRR or SAR message carrying disaster recovery indication information to the HSS. The SRR or SAR message carries the IMPU of the registration request in order to request the HSS to recover the user backup data of the IMPU. The service configuration data of the IMPU may also be requested. If the user service configuration data (service profile) is already returned in the SAA message, User-Data-Already-Available in the request may be set to "USER_DATA_ALREADY_AVAILABLE" such that the HSS does not send the service profile again, but the user backup data is still sent.

Step 14: After receiving the request for recovering the user data of the IMPU, the HSS returns the user backup data of the IMPU or the user backup data of all IMPIs in the implicit registration set of the IMPU and the service profile of the IMPU or the service profiles of all IMPUs in the implicit registration set of the IMPU. If the S-CSCF sets User-Data-Already-Available to "USER_DATA_ALREADY_AVAILABLE", the HSS may not return the service profile.

After receiving the response, the S-CSCF2 performs recovery operations according to the backup data in the response.

Figure 15:
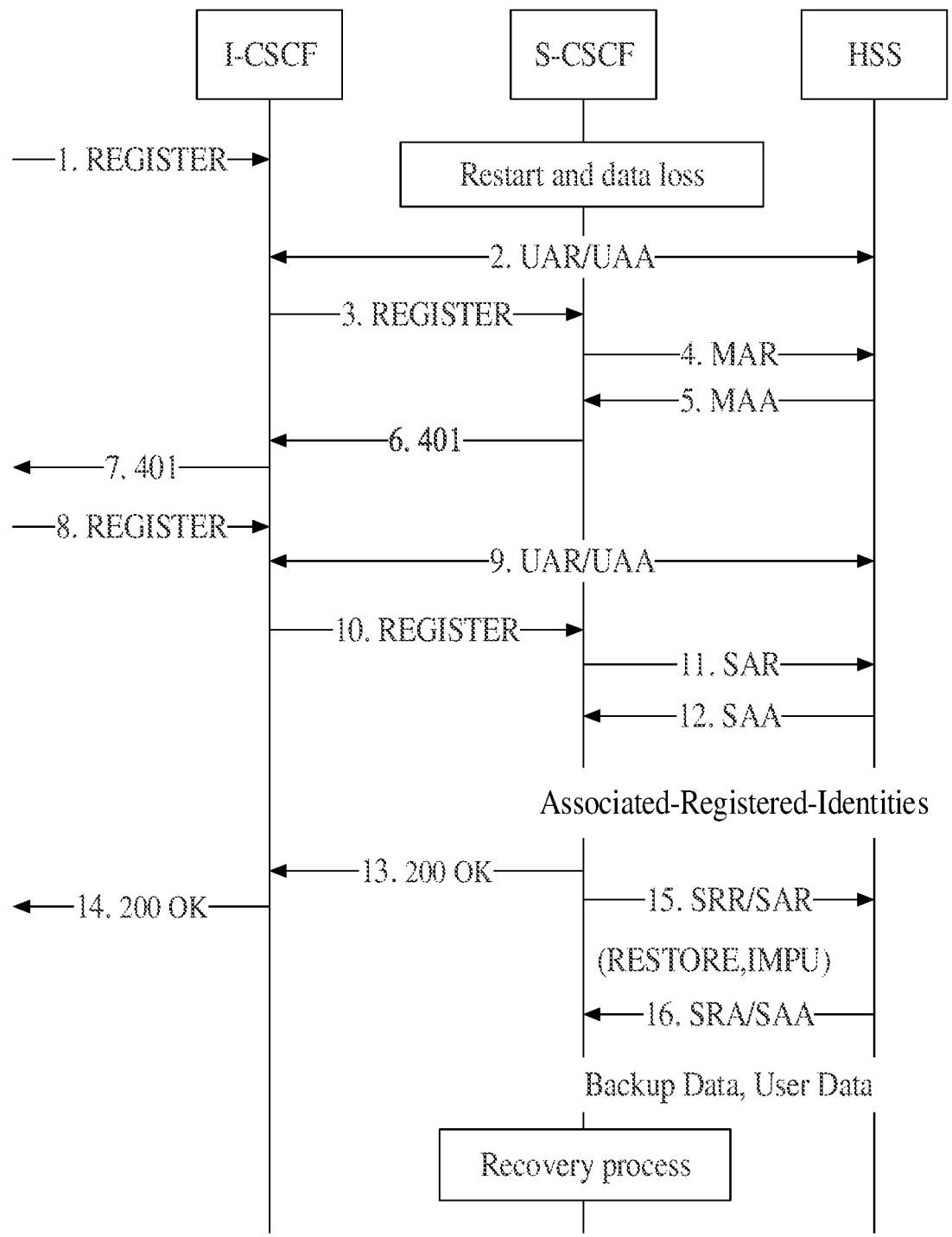
FIG. 15 is a flowchart of a method for disaster recovery according to a tenth embodiment of the present disclosure.

FIG. 15 is a flowchart of a method for disaster recovery according to a tenth embodiment of the disclosure.

In the tenth embodiment, an S-CSCF determines that disaster recovery needs to be performed. The service data of one IMPU, service data of IMPUs in the implicit registration set of the IMPU, and backup data of all registered IMPIs that are associated with the IMPU are recovered once. An example of an application scenario where a service triggers disaster recovery is as follows. The S-CSCF is restarted, and call origination by a UE or registration of the UE triggers disaster recovery, if the S-CSCF is restarted and the user data of the caller is unavailable when the UE originates a call, the UE performs re-registration.

As shown in FIG. 15, the process of disaster recovery includes the following steps.

Steps 1-11: A UE originates a registration request after an S-CSCF is successfully restarted, an I-CSCF sends a registration request to the restarted S-CSCF by exchanging a UAR or UAA message with an HSS, and the S-CSCF originates an SAR message to the HSS after authenticating the UE.

Steps 12-16: These steps are the same as steps 10-14 in the ninth embodiment (i.e., FIG. 14). The restarted S-CSCF can completely recover all registration data and service data of an IMPU and of IMPUs in the implicit registration set of the IMPU in one operation.

Figure 16:
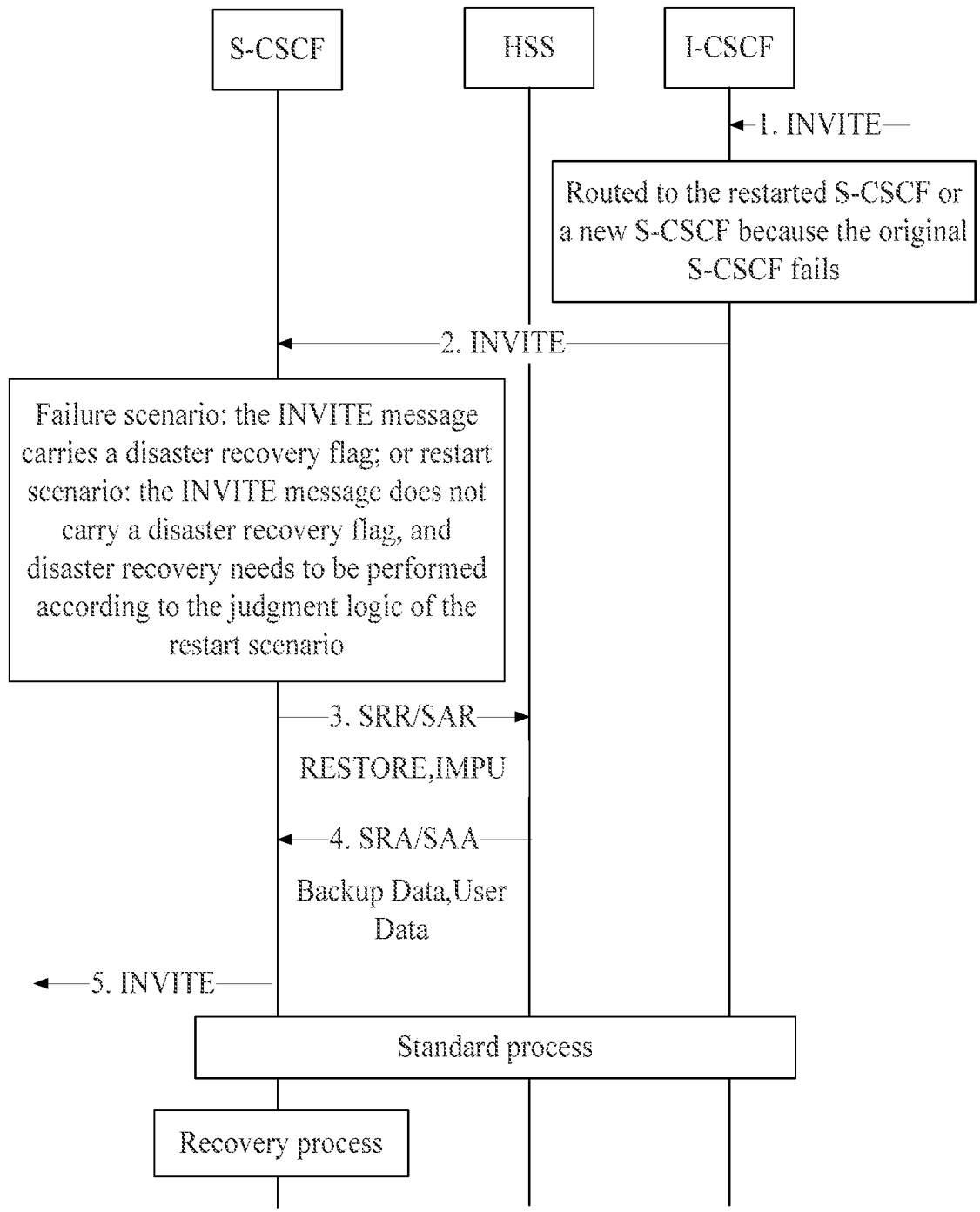
FIG. 16 is a flowchart of a method for disaster recovery according to an eleventh embodiment of the present disclosure.

FIG. 16 is a flowchart of a method for disaster recovery according to an eleventh embodiment of the disclosure.

In the eleventh embodiment, an S-CSCF determines that disaster recovery needs to be performed. The service data of one IMPU, service data of IMPUs in the implicit registration set of the IMPU, and registration data of all registered IMPIs that are associated with the IMPU are recovered once. An example of an application scenario where a service triggers disaster recovery is as follows. The S-CSCF fails or is restarted, and call termination by a UE or call origination by an AS in place of the UE through an I-CSCF triggers disaster recovery.

As shown in FIG. 16, the process of disaster recovery includes the following steps.

Steps 1-3: An I-CSCF receives a service termination request from a UE or a service origination request from an AS in place of the UE (i.e., an INVITE message), and then originates a query message to an HSS to obtain the current S-CSCF. If the current S-CSCF fails, the I-CSCF interacts with the HSS to select another S-CSCF, and then forwards the service request with a disaster recovery flag to the new S-CSCF, if the current S-CSCF indicated by the HSS is restarted successfully after it fails, the I-CSCF forwards the service request to the successfully restarted S-CSCF.

The S-CSCF that receives the service request determines that disaster recovery needs to be performed according to the disaster recovery flag in the received service request. Alternatively, the service request may not carry a disaster recovery flag, and when the S-CSCF finds that the UE is not registered locally, the S-CSCF originates an SAR (UNREGISTERED_USER) request to the HSS. After receiving the request, the HSS finds that the UE is in the REGISTERED state, and then returns an SAA (DIAMETER_ERROR_IN_ASSIGNMENT_TYPE) message. The S-CSCF may perform disaster recovery after receiving the SAA (DIAMETER_ERROR_IN_ASSIGNMENT_TYPE) message.

Step 4: In the SAA message, the HSS returns the service profile of the IMPU or the service profiles of all IMPUs in the implicit registration set of the IMPU and the user backup data of all IMPIs associated with the IMPU or the user backup data of all IMPIs in the implicit registration set of the IMPU. The HSS may return an SAA message carrying the service profile of the IMPU or the service profiles of all IMPUs in the implicit registration set of the IMPU and the user backup data of all IMPIs associated with the IMPU or the user backup data of all IMPIs associated with all IMPUs in the implicit registration set of the IMPU as well as DIAMETER_ERROR_IN_ASSIGNMENT_TYPE described in step 3 to the S-CSCF.

After receiving the response, the S-CSCF performs recovery operations according to the backup data in the response.

When the AS originates a call in place of the UE, the call may reach the S-CSCF without passing through the I-CSCF, and disaster recovery may be performed in two cases.

Case (1): If the S-CSCF obtained from the HSS cannot be contacted, the AS may route a session to the I-CSCF for subsequent routing. The subsequent disaster recovery process is the same as above.

Case (2): If the S-CSCF obtained from the HSS can be contacted, but the S-CSCF is restarted, user data may be lost. The S-CSCF determines that user data needs to be recovered from the HSS according to the logic of a restart scenario. For other processing steps, see step 3 and subsequent steps.

Therefore, in the ninth to eleventh embodiments, the user backup data and user service data that are associated with the affected IMPU are recovered completely in each service triggering operation. The complete user service data and user backup data can be obtained in each service triggering operation, and the one-IMPU multi-IMPI, one-IMPI multi-IMPU, or multi-IMPI multi-IMPU service can also be recovered. Thus, the user has better service continuity experiences.

To implement the foregoing processing methods provided in embodiments of the disclosure, the existing network system and device functions need to be extended accordingly.

Figure 17:
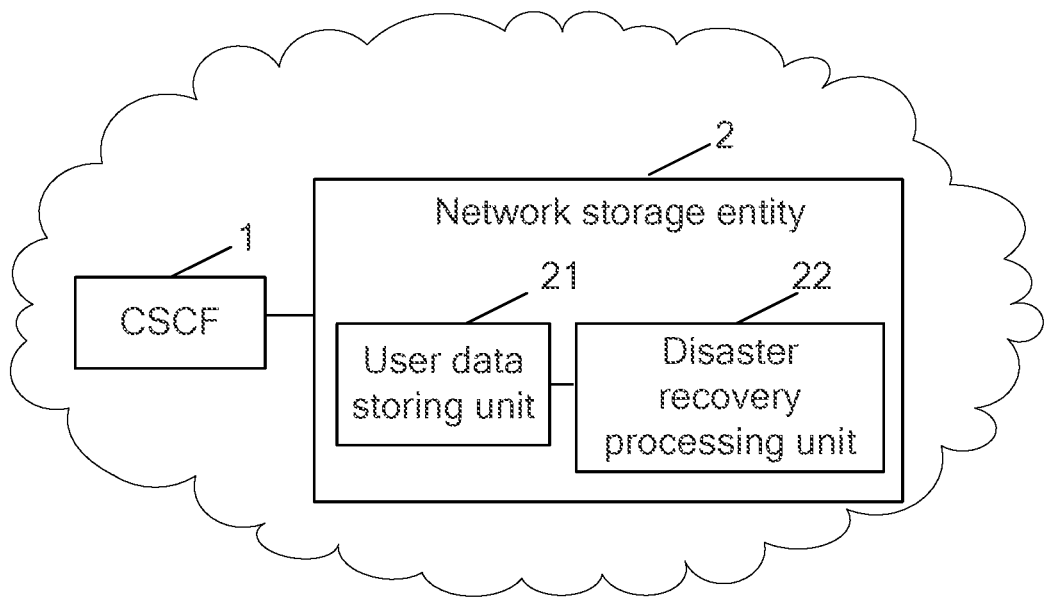
FIG. 17 shows a network structure of an IMS about disaster recovery according to an embodiment of the present disclosure.

FIG. 17 shows a network structure of an IMS about disaster recovery according to an embodiment of the disclosure.

In this embodiment, an IMS includes a CSCF 1, such as an S-CSCF, and a network storage entity 2, such as an HSS. The network storage entity 2 includes a user data storing unit 21 and a disaster recovery processing unit 22.

The user data storing unit 21 is adapted to store user service configuration data, user backup data for recovering user services, and information of a CSCF where a user is registered.

Figure 18:
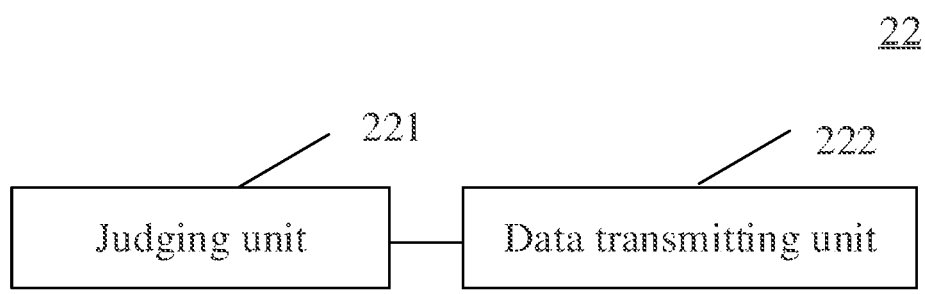
FIG. 18 shows a structure of a disaster recovery processing unit according to an embodiment of the present disclosure.

The disaster recovery processing unit 22 is adapted to perform disaster recovery. An example structure of the disaster recovery processing unit 22 is shown in FIG. 18. The disaster recovery processing unit 22 includes a judging unit 221 and a data transmitting unit 222.

Figure 19:
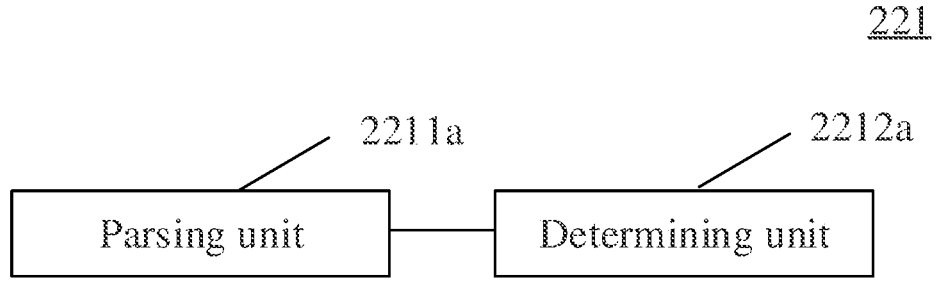
FIG. 19 shows a structure of a judging unit according to an embodiment of the present disclosure.

The judging unit 221 is adapted to judge whether to perform disaster recover for a CSCF. During implementation, the judging unit 221 may adopt various structures. For example, one structure of the judging unit 221 shown in FIG. 19 includes a parsing unit 2211a, adapted to parse an SAR message carrying a recovery indication that is sent by a CSCF in order to determine whether the SAR message carries recovery indication information, and a determining unit 2212a, according to the parsing result of the parsing unit 2211a, adapted to determine that disaster discovery needs to be performed for a CSCF if the SAR message carries recovery indication information.

Figure 20:
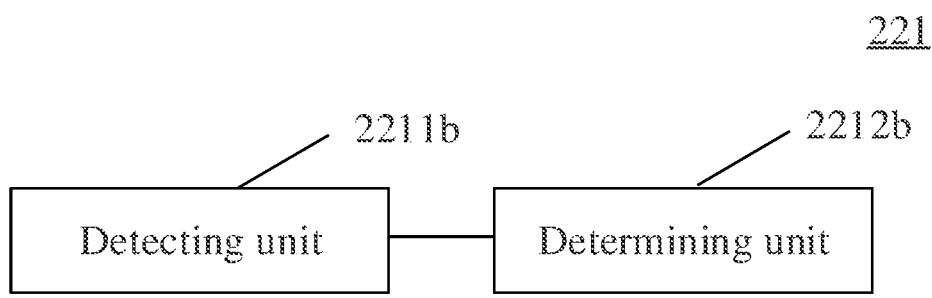
FIG. 20 shows a structure of a judging unit shown in FIG. 19 according to another embodiment of the present disclosure.

In addition, another example structure of the judging unit 221 shown in FIG. 20 includes a detecting unit 2211b adapted to detect whether a CSCF where a user is registered changes and whether a network storage entity of the user receives an RTA message returned by the CSCF after sending an RTR message to the original CSCF where the user is registered, and a determining unit 2212b adapted to determine that disaster recovery needs to be performed for the CSCF if the detection result of the detecting unit 2211b shows that the CSCF where the user is registered changes and that the network storage entity of the user does not receive the RTA message returned by the CSCF.

Figure 21:
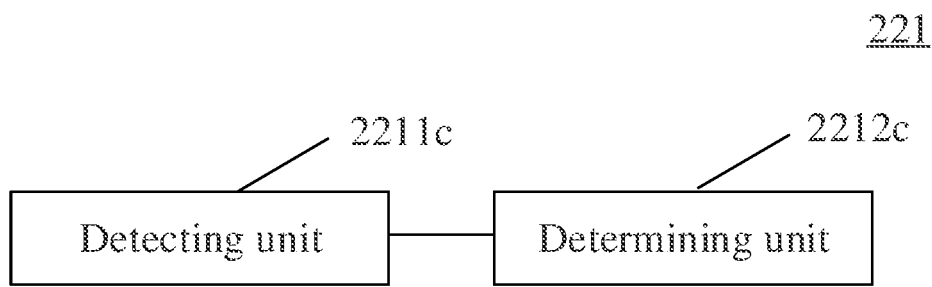
FIG. 21 shows a structure of a judging unit shown in FIG. 19 according to still another embodiment of the present disclosure.

In addition, another example structure of the judging unit 221 shown in FIG. 21 includes a detecting unit 2211c adapted to detect whether a CSCF where a user is registered changes and whether the original CSCF where the user is registered fails, and a determining unit 2212c adapted to determine that disaster recovery needs to be performed for the CSCF if the detection result of the detecting unit 2211c shows that the CSCF where the user is registered changes and that the original CSCF where the user is registered fails.

The data transmitting unit 222 is adapted to transmit the user backup data of the registered IMPIs that are associated with the user and the user service configuration data of the IMPUs in an IMS subscription to a redundant CSCF by interacting with the redundant CSCF once or many times if the judgment result of the judging unit 221 is yes.

Figure 22:
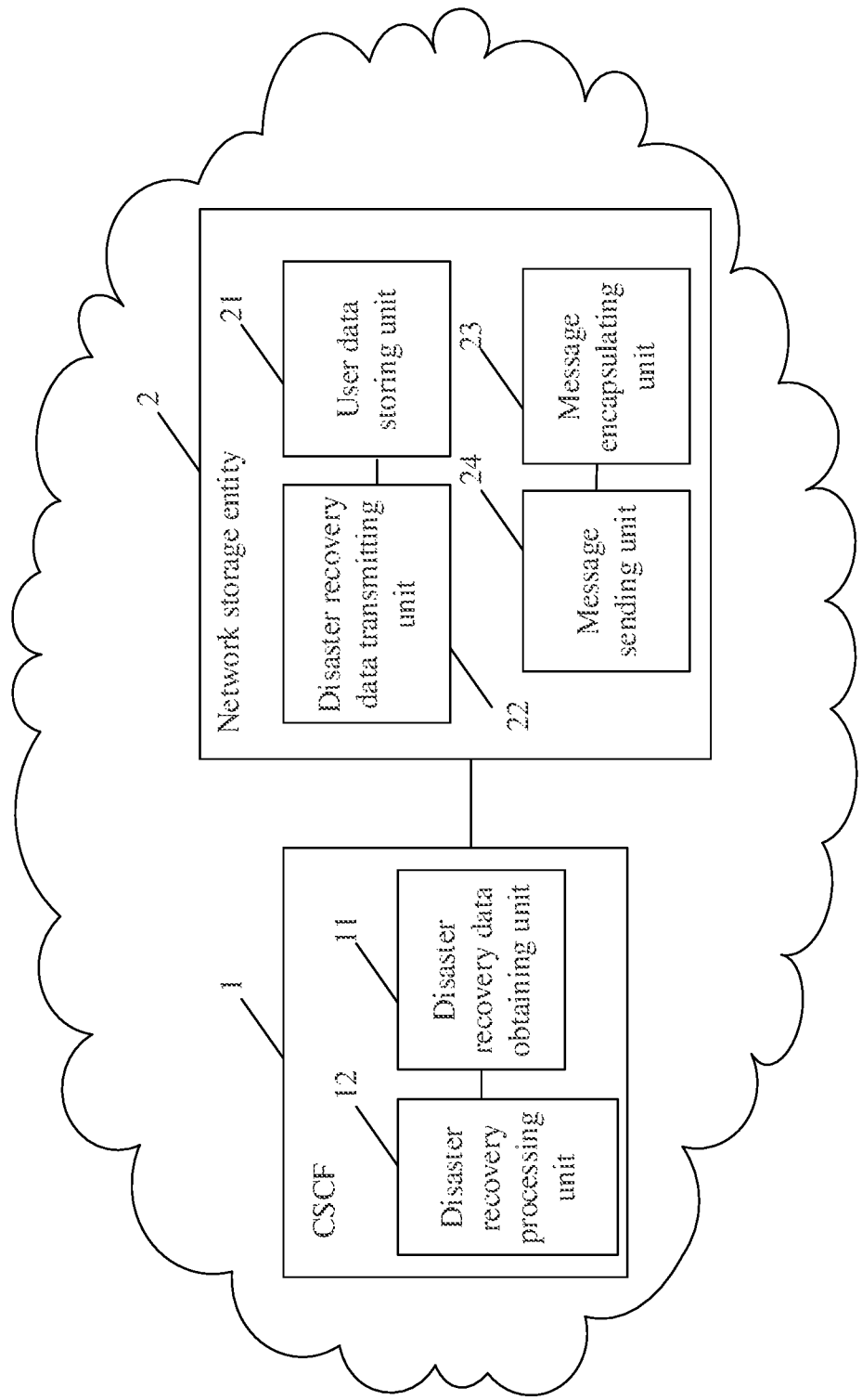
FIG. 22 shows another network structure of an IMS about disaster recovery according to an embodiment of the present disclosure.

FIG. 22 shows another network structure of an IMS about disaster recovery in an embodiment of the disclosure.

In this embodiment, an IMS includes a CSCF 1, such as an S-CSCF, and a network storage entity 2, such as an HSS. The CSCF 1 includes a disaster recovery data obtaining unit 11 and a disaster recovery processing unit 12.

The disaster recovery data obtaining unit 11 is adapted to obtain the user backup data of the registered IMPIs that are associated with user IMPUs and the user service configuration data of the IMPUs in an IMS subscription from a network storage entity of the user according to the information of registered IMPIs or IMPUs that is carried in a response returned by the network storage entity after a service triggers disaster recovery.

The disaster recovery processing unit 12 is adapted to recover the corresponding service according to the user backup data of the registered IMPIs and the user service configuration data of the IMPUs in the IMS subscription that are obtained by the disaster recovery data obtaining unit 11.

Figure 23:
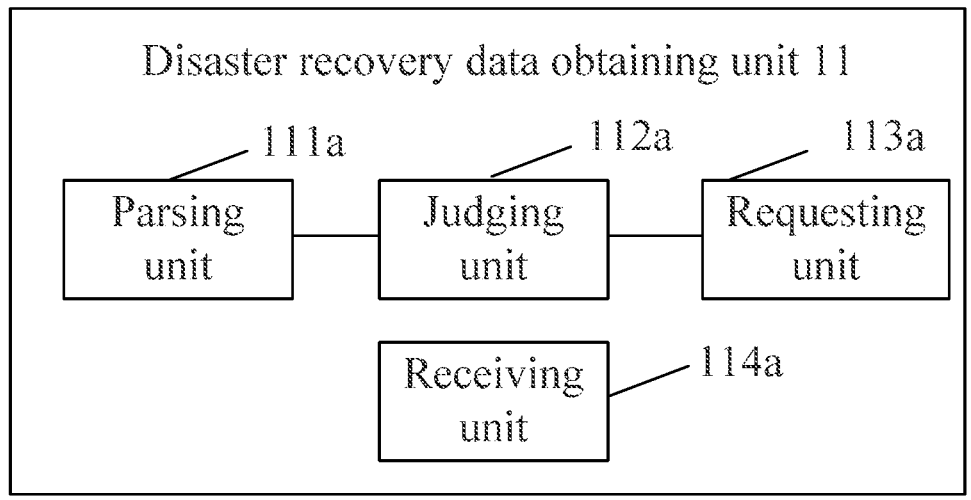
FIG. 23 shows a structure of a disaster recovery data obtaining unit according to an embodiment of the present disclosure.

In one example structure of the disaster recovery data obtaining unit 11 of the disclosure shown in FIG. 23, the disaster recovery data obtaining unit 11 may include a parsing unit 111a adapted to parse the information of the registered IMPIs that are associated with user IMPUs in an IMS subscription transmitted from an HSS of the user, a judging unit 112a adapted to determine an IMPI to be recovered according to the received information of registered IMPIs, a requesting unit 113a adapted to request the user backup data of the IMPI and the user service configuration data of the IMPU associated with the IMPI determined by the judging unit 112a from the HSS of the user, and a receiving unit 114a adapted to receive the user backup data of the IMPI and the user service configuration data of the IMPU associated with the IMPI carried in the response returned by the HSS of the user.

Figure 24:
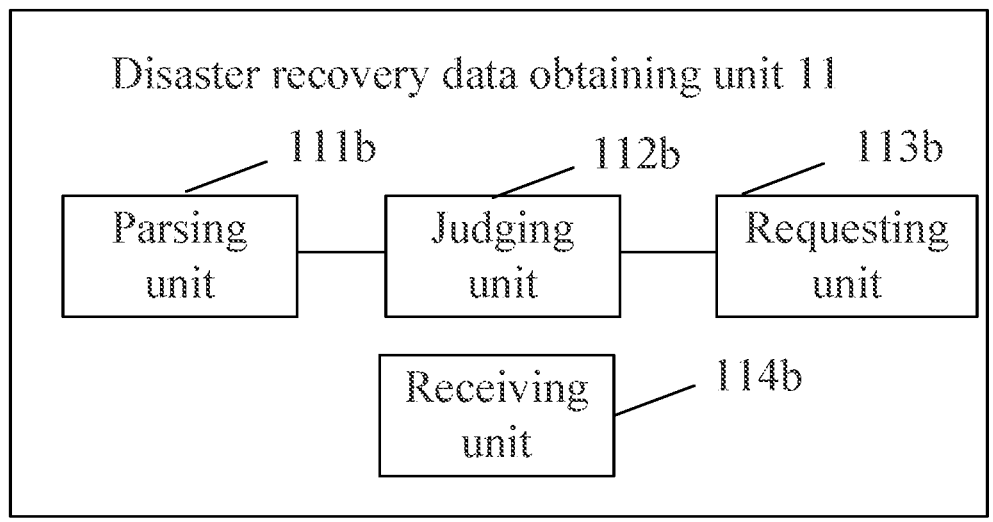
FIG. 24 shows a structure of a disaster recovery data obtaining unit according to another embodiment of the present disclosure.

In addition, in another example structure of the disaster recovery data obtaining unit 11 of the disclosure shown in FIG. 24, the disaster recovery data obtaining unit 11 may include a parsing unit 111b adapted to parse the information of the registered IMPUs that are associated with user IMPUs in an IMS subscription transmitted from an HSS of the user, a judging unit 112b adapted to determine an IMPU to be recovered according to the received information of registered IMPUs, a requesting unit 113b adapted to request the user backup data of the registered IMPI that is directly associated with the IMPU determined by the judging unit 112b and the user service configuration data of the IMPU associated with the IMPI from the HSS of the user, and a receiving unit 114b adapted to receive the user backup data of the registered IMPI that is directly associated with the IMPU and the user service configuration data of the IMPU carried in the response returned by the HSS of the user.

Figure 25:
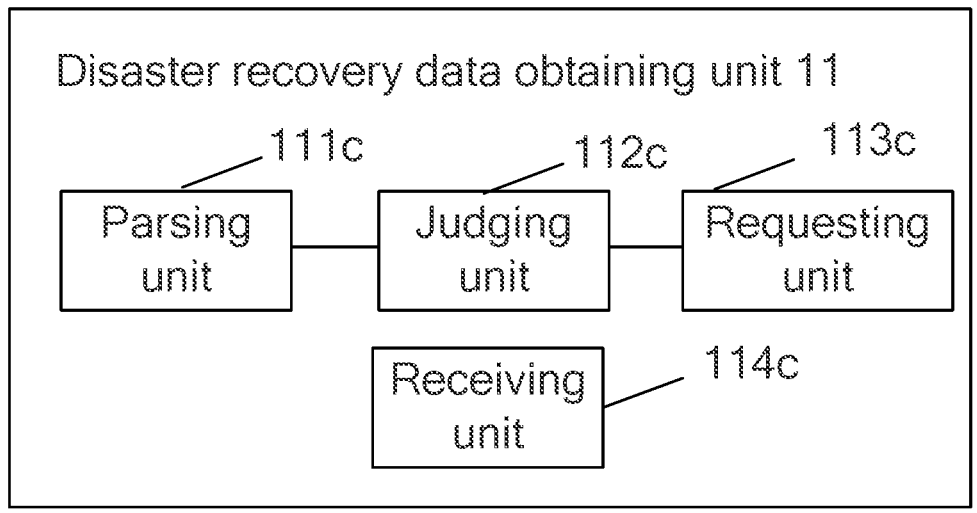
FIG. 25 shows a structure of a disaster recovery data obtaining unit according to still another embodiment of the disclosure.

In another example structure of the disaster recovery data obtaining unit 11 of the disclosure shown in FIG. 25, the disaster recovery data obtaining unit 11 may include a parsing unit 111c adapted to parse the information of the registered IMPIs that are associated with user IMPUs in an IMS subscription transmitted by a network storage entity of the user, a judging unit 112c adapted to determine an IMPU to be recovered according to the received information of registered IMPIs, a requesting unit 113c adapted to request the user backup data of the registered IMPI that is directly associated with the IMPU to be recovered, which is determined by the judging unit 112c, and the user service configuration data of the IMPU from the network storage entity of the user, and a receiving unit 114c adapted to receive the user backup data of the registered IMPI that is directly associated with the IMPU and the user service configuration data of the IMPU carried in the response returned by the network storage entity of the user.

The network storage entity 2 includes a user data storing unit 21 adapted to store user service configuration data, user backup data for recovering user services, and information of a CSCF where a user is registered, and a disaster recovery data transmitting unit 22 adapted to transmit the user backup data for disaster recovery to a CSCF.

In addition, the network storage entity 2 further includes a message encapsulating unit 23 adapted to encapsulate a response carrying the information of registered IMPIs or IMPUs, where the response may be any message such as an SAA message, which carries the information of registered IMPIs or IMPUs through an AVP:Associated-Registered-Identities of the SAA message or by adding a flag bit to the AVP:Associated-Identities of the SAA message, and a message sending unit 24 adapted to send the response that carries the information of registered IMPIs or IMPUs to a CSCF.

Figure 26:
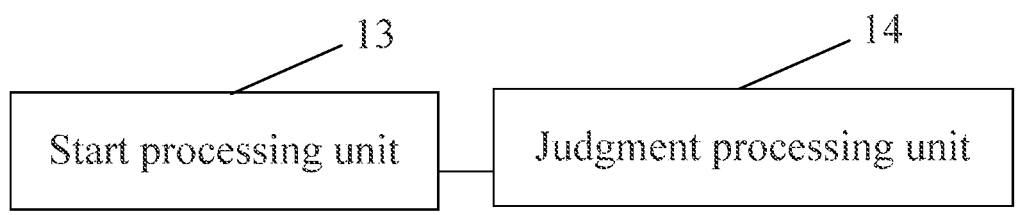
FIG. 26 shows a structure of a CSCF according to an embodiment of the disclosure.

As shown in FIG. 26, a CSCF about disaster recovery data backup may include the following functional units in a network structure of an IMS about disaster recovery in an embodiment of the disclosure, a start processing unit 13 adapted to start disaster recovery data backup, which may start disaster recovery data backup after user registration subscription is complete during implementation, and a judgment processing unit 14 adapted to judge whether to back up registration subscription data after the start processing unit 13 starts disaster recovery data backup, and back up the registration subscription data if the judgment result is to back up registration subscription data.

Although the disclosure has been described through several exemplary embodiments, the disclosure is not limited to such embodiments. It is apparent that those skilled in the art can make various modifications and variations to the disclosure without departing from the spirit and scope of the disclosure. The disclosure is intended to cover the modifications and variations provided that they fall in the scope of protection defined by the following claims or their equivalents.

What is claimed is:

1. A method for disaster recovery, comprising:
sending, by a network storage device, information of registered Internet Protocol (IP) Multimedia Subsystem (IMS) Private User Identities (IMPIs) that are associated with an IMS Public User Identity (IMPU) in an IMS subscription to a Call Session Control Function (CSCF) server;
receiving, by the CSCF server, the information of registered IMPIs that are associated with the IMPU;
determining, by the CSCF server, that at least one IMPI received from the network storage device is not registered in the CSCF server;
sending, by the CSCF server, a request message including a recovery indication to the network storage device for requesting user service configuration data of the IMPU and user backup data of IMPIs associated with the IMPU;
sending, by the network storage device, the user service configuration data and the user backup data to the CSCF server after the request message is received; and
receiving, by the CSCF server, the user service configuration data and the user backup data in a response from the network storage device, wherein the user service configuration data and the user backup data are to be used by the CSCF server for recovering a corresponding service.

2. The method according to claim 1, wherein the information of registered IMPIs is carried in a parameter of a Server Assignment Answer (SAA) message from the network storage device.

3. The method according to claim 1, further comprising sending, by the CSCF server, a Server Assignment Request (SAR) message to the network storage device after authenticating a user equipment (UE).

4. The method according to claim 1, wherein the CSCF server comprises a newly selected CSCF server that serves a user when an original CSCF server that serves the user fails.

5. The method according to claim 1, wherein the CSCF server comprises a newly selected CSCF server that serves a user when an original CSCF server that serves the user restarts.

6. The method according to claim 1, wherein the user backup data of the IMPIs comprises:
a contact address of a user equipment (UE); and
registration state subscription data of the UE during UE registration,
wherein the method further comprises sending, by the CSCF server, a NOTIFY message to all registered UEs according to the contact address and the registration state subscription data to notify the UE to register with a network.

7. The method according to claim 1, further comprising sending, by the network storage device, all IMPIs in the IMS subscription to the CSCF server.

8. A system for disaster recovery, comprising:
a network storage device; and
a Call Session Control Function (CSCF) server configured to communicate with the network storage device,
wherein the CSCF server is configured to:
receive information of registered Internet Protocol (IP) Multimedia Subsystem (IMS) Private User Identities (IMPIs) that are associated with an IMS Public User Identity (IMPU) in an IMS subscription from the network storage device;
determine that at least one IMPI received from the network storage device is not registered in the CSCF server;
send a message including a recovery indication to the network storage device for requesting user service configuration data of the IMPU and user backup data of IMPIs associated with the IMPU; and
receive the user service configuration data and the user backup data in a response from the network storage device, wherein the user service configuration data and the user backup data are to be used by the CSCF server for recovering a corresponding service,
wherein the network storage device is configured to:
send the information of registered IMPIs in the IMS subscription to the CSCF server;
receive the message including the recovery indication for requesting the user service configuration data and the user backup data; and send the user service configuration data and the user backup data to the CSCF server.

9. The system according to claim 8, wherein the information of registered IMPIs is carried in a parameter of a Server Assignment Answer (SAA) message received from the network storage device.

10. The system according to claim 8, wherein the CSCF is configured to send a Server Assignment Request (SAR) message to the network storage device after authenticating a user equipment (UE).

11. The system according to claim 8, wherein the CSCF comprises a newly selected CSCF that serves a user when an original CSCF that serves the user fails.

12. The system according to claim 8, wherein the CSCF comprises a newly selected CSCF that serves a user when an original CSCF that serves the user restarts.

13. The system according to claim 8, wherein the user backup data of the IMPIs comprises:
 a contact address of a user equipment (UE); and
 registration state subscription data of the UE during UE registration,
 wherein the CSCF is further configured to send a NOTIFY message to all registered UEs according to the contact address and the registration state subscription data to notify the UE to register with a network.

14. The system according to claim 8, wherein the network storage device is further configured to send all IMPIs in the IMS subscription to the CSCF server.

15. A method for disaster recovery, comprising:
 sending, by a network storage device, information of registered Internet Protocol (IP) Multimedia Subsystem (IMS) Private User Identities (IMPIs) that are associated with an IMS Public User Identity (IMPU) in an IMS subscription to a Call Session Control Function (CSCF) server;
 receiving, by the network storage device, a request message including a recovery indication from the CSCF server for requesting user service configuration data of the IMPU and user backup data of IMPIs associated with the IMPU; and
 sending, by the network storage device, the user service configuration data and the user backup data to the CSCF server.

16. The method according to claim 15, wherein the information of registered IMPIs is carried in a parameter of a Server Assignment Answer (SAA) message from the network storage device.

17. The method according to claim 16, further comprising sending, by the network storage device, all IMPIs in the IMS subscription to the CSCF server.

18. The method according to claim 15, wherein the user backup data of the IMPIs comprises:
 a contact address of a user equipment (UE); and
 registration state subscription data of the UE during UE registration,
 wherein the CSCF is further configured to send a NOTIFY message to all registered UEs according to the contact address and the registration state subscription data to notify the UE to register with a network.

19. The method according to claim 15, wherein the CSCF comprises a newly selected CSCF that serves a user when an original CSCF that serves the user fails.

20. The method according to claim 15, wherein the CSCF comprises a newly selected CSCF that serves a user when an original CSCF that serves the user restarts.

* * * * *